(12) United States Patent
Sakamoto et al.

(10) Patent No.: US 8,879,915 B2
(45) Date of Patent: Nov. 4, 2014

(54) OPTICAL SWITCHING DEVICE, OPTICAL ADD DEVICE, AND OPTICAL DROP DEVICE

(75) Inventors: Takeshi Sakamoto, Kawasaki (JP); Kazuo Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 13/137,501

(22) Filed: Aug. 22, 2011

(65) Prior Publication Data
US 2012/0128347 A1 May 24, 2012

(30) Foreign Application Priority Data
Nov. 24, 2010 (JP) .................................. 2010-261307

(51) Int. Cl.
*H04J 14/02* (2006.01)

(52) U.S. Cl.
CPC ............ *H04J 14/0204* (2013.01); *H04J 14/021* (2013.01); *H04J 14/0213* (2013.01); *H04J 14/0212* (2013.01); *H04J 14/0209* (2013.01); *H04J 14/0205* (2013.01); *H04J 14/0219* (2013.01); *H04J 14/0217* (2013.01)
USPC .......... 398/83; 398/9; 398/36; 398/48; 398/50

(58) Field of Classification Search
None
See application file for complete search history.

(56) References Cited

U.S. PATENT DOCUMENTS

| 2005/0281558 | A1 | 12/2005 | Wang et al. | |
| 2006/0034610 | A1 | 2/2006 | Akiyama et al. | |
| 2008/0232800 | A1* | 9/2008 | Jensen | ........................... 398/48 |
| 2009/0220242 | A1 | 9/2009 | Ooi et al. | |
| 2010/0221004 | A1* | 9/2010 | Haslam et al. | ................... 398/49 |
| 2010/0260499 | A1 | 10/2010 | Izumi | |

FOREIGN PATENT DOCUMENTS

| EP | 1628424 A2 * | 2/2006 |
| JP | 2006-087062 | 3/2006 |
| JP | 2008-503921 | 2/2008 |
| JP | 2008-252664 | 10/2008 |
| JP | 2009-212584 | 9/2009 |
| JP | 2010-81374 | 4/2010 |
| JP | 2010-098545 | 4/2010 |
| JP | 2010-245993 | 10/2010 |

OTHER PUBLICATIONS

Gringeri et al.; "Flexible Architectures for Optical Transport Nodes and Networks", IEEE Communications Magazine; Jul. 2010; pp. 40-50.
Sorin Tibuleac, "ROADM Network Design Issues"; NFOEC 2009, Tutorial; Mar. 23, 2009; pp. 1-48.
Japanese Office Action mailed Apr. 15, 2014 in corresponding Japanese Application No. 2010-261307.

* cited by examiner

*Primary Examiner* — Ken Vanderpuye
*Assistant Examiner* — David Lambert
(74) *Attorney, Agent, or Firm* — Staas & Halsey LLP

(57) ABSTRACT

An optical switching device includes plural wavelength selective switches that respectively have a first port and a plurality of second ports; and an optical coupler that has a plurality of third ports on an input-side or an output-side, respectively optically coupled to the first ports of the wavelength selective switches.

10 Claims, 27 Drawing Sheets

OPTICAL SWITCHING DEVICE, OPTICAL ADD DEVICE, AND OPTICAL DROP DEVICE

CROSS REFERENCE TO RELATED APPLICATIONS

This application is based upon and claims the benefit of priority of the prior Japanese Patent Application No. 2010-261307, filed on Nov. 24, 2010, the entire contents of which are incorporated herein by reference.

FIELD

The embodiments discussed herein are related to an optical switching device, an optical add device, and an optical drop device.

BACKGROUND

Conventionally, in optical communication, wavelength division multiplex (WDM) networks that transmit WDM optical signals are used (see, for example, Japanese Laid-Open Patent Publication Nos. 2006-87062, 2008-503921, and 2010-98545). In WDM networks, optical add-drop devices such as optical add-drop multiplexers (OADM) and reconfigurable-OADMs (R-OADM) that add and/or drop optical signals according to wavelength are used. In optical add/drop devices, wavelength selective switches that switch the path of optical signals, according to channel are used.

Functions for efficiently and flexibly building, modifying, and managing WDM networks is demanded of optical add-drop devices. For example, functions enabling wavelength dependency (colored), direction dependency (directional), and collision of identical wavelengths (contention) among nodes to be avoided is demanded of optical add-drop devices. Such functions are called colorless, directionless, contentionless (CDC) functions.

Colorless describes a function of being able to input an arbitrary wavelength into an arbitrary port of an optical add-drop device and to output an arbitrary wavelength from an arbitrary output. Directionless describes a function of being able to guide optical signals from terminals to an arbitrary degree and to guide optical signals from the degrees to an arbitrary terminal, in a configuration in which the optical add-drop device has multiple degrees (WDM degrees). Contentionless describes a function of being able to avoid collisions of optical signals of the same wavelength in the optical add-drop device.

Further, the following points are preferably satisfied in a configuration satisfying CDC function.

All client-side signals can be switched between wavelengths of arbitrary degrees and arbitrary wavelengths (100% add/drop capability).

From an initial operation state until the 100% add/drop state, client-side signals and the number of network-side degrees can be increased by a given unit that is as small as possible (achieving initial cost reductions and optimal cost).

When client-side signals and network-side degrees are increased, existing signals are not affected (in-service upgrade).

In an add/drop unit between a client-side signal and a network-side degree, to build a configuration that minimizes use of devices having an optical amplifying function such as an optical amplifier, a configuration that minimizes optical loss is adopted.

Since optical devices such as wavelength selective switches (WSS) and optical cross connects (OXC) are restricted in terms of optical port count, a configuration that takes into consideration the balance of port count and device count as well as optical loss is adopted.

However, with the conventional technologies above, a problem arises in that the realization of a wavelength selective switch having a large number of ports is difficult. Consequently, for example, the realization of configurations capable of implementing CDC function, having a large number of switching destinations for optical signals of each channel, etc. has been difficult.

SUMMARY

According to an aspect of an embodiment, an optical switching device includes plural wavelength selective switches that respectively have a first port and a plurality of second ports; and an optical coupler that has a plurality of third ports on an input-side or an output-side, respectively optically coupled to the first ports of the wavelength selective switches.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1A:
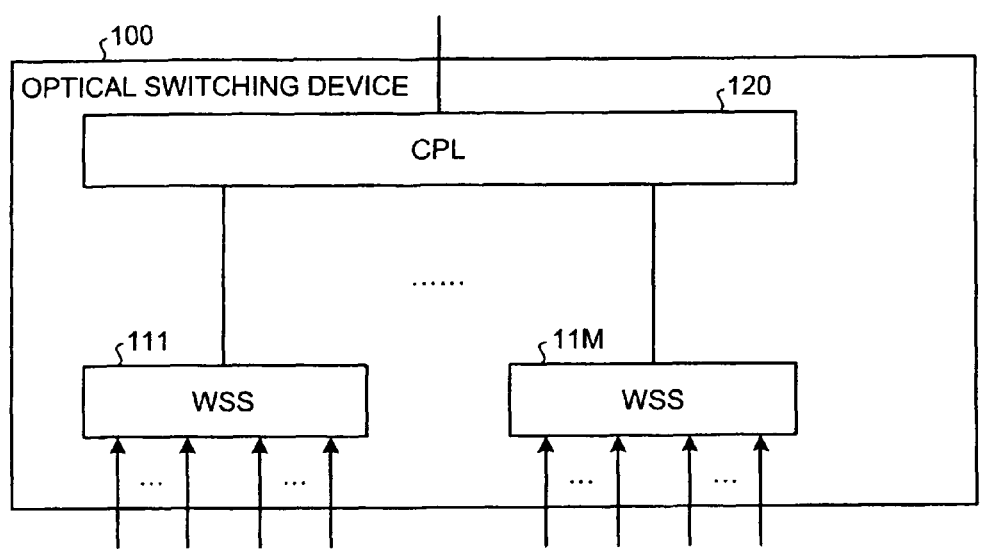
FIG. 1A is a diagram depicting an example of an optical switching device according to an embodiment.

FIG. 1A is a diagram depicting an example of an optical switching device according to an embodiment. As depicted in FIG. 1A, an optical switching device 100 according to the embodiment includes M wavelength selective switches (WSS) 111-11M and an optical coupler 120 (CPL). The wavelength selective switches 111-11M respectively have an output port (first port) and plural input ports (second ports). Optical signals that are input to the respective wavelength selective switches 111-11M may be WDM signals of plural wavelengths that have been multiplexed or may be signals that include only 1 wavelength.

The optical coupler 120 has plural input ports (third ports on the input-side). The respective output ports of the wavelength selective switches 111-11M are optically coupled to the input ports of the optical coupler 120. The optical coupler 120 couples optical signals output from the output ports of the wavelength selective switches 111-11M and outputs the resulting signal.

Like the optical switching device 100, a wavelength selective switch having a large number of input ports can be easily realized by optically coupling the input ports (third ports) of the optical coupler 120 to the output ports (first ports) of the wavelength selective switches 111-11M, respectively.

The optical coupler 120 may have more import ports than the number (M) of the wavelength selective switches 111-11M, whereby the input ports of the optical switching device 100 can be easily increased by optically coupling a new wavelength selective switch to the optical coupler 120. Further, for example, initial costs can be suppressed at the initial operation state, by reducing the number of wavelength selective switches 111-11M.

In addition, by optically coupling a new wavelength selective switch to the optical coupler 120, the number of input ports can be increased even while in service. Therefore, for example, unlike replacing the wavelength selective switch with one that has a larger number of input ports, the number of input ports can be increased without interruptions in service.

The optical switching device 100 can be applied to an optical add device that adds (inserts) optical signals in units of wavelength, for example. The optical add device to which the optical switching device 100 is applied outputs to a network, an optical signal coupled by the optical coupler 120 of the optical switching device 100. Further, optical paths are disposed to the optical add device, whereby optical signals transmitted by plural transmitters and optical signals from degrees that are different from a given degree, are respectively input to the input ports of the wavelength selective switches 111-11M.

Figure 1B:
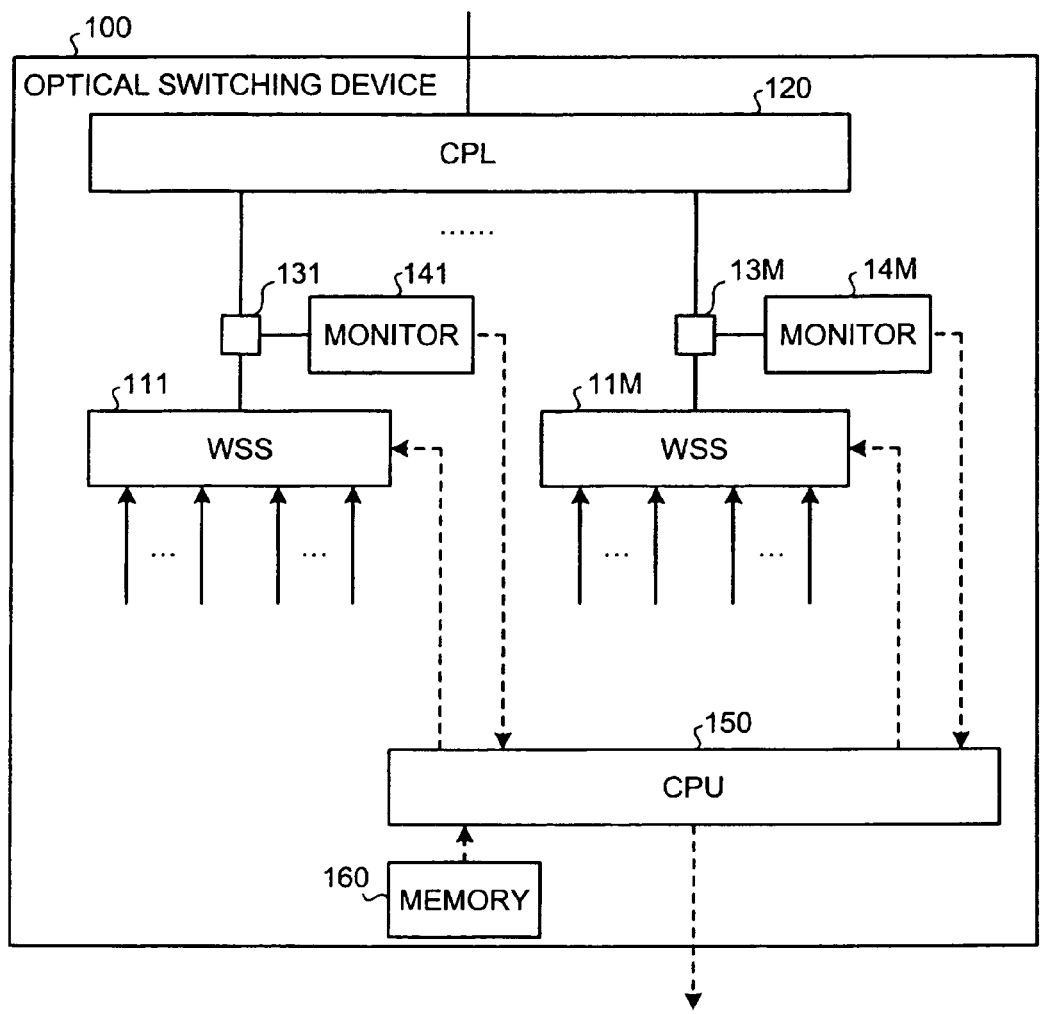
FIG. 1B is a diagram of an example of modification of the optical switching device depicted in FIG. 1A.

FIG. 1B is a diagram of an example of modification of the optical switching device depicted in FIG. 1A. In FIG. 1B, components identical to those depicted in FIG. 1A are given the same reference numerals used in FIG. 1A and description thereof is omitted. As depicted in FIG. 1B, the optical switching device 100 may include splitters 131-13M, monitors 141-14M, and a central processing unit (CPU) 150, in addition to the configuration depicted in FIG. 1A.

The splitter 131 splits and outputs to the monitor 141, an optical signal that is output from the wavelength selective switch 111 to the optical coupler 120. Similarly, the splitters 132-13M each split and output to the monitors 142-14M, optical signals respectively output from the wavelength selective switches 112-11M to the optical coupler 120. The splitters 131-13M, for example, can be implemented by an optical coupler.

The monitors 141-14M are respectively wavelength monitors that monitor each wavelength included in the optical signals output from the wavelength selective switches 111-11M to the optical coupler 120. For example, the monitors 141-14M respectively monitor the wavelengths included the optical signals output from the splitters 131-13M. The monitors 141-14M output monitoring results, as output wavelength information, to the CPU 150. The monitors 141-14M, for example, can be implemented by optical channel monitors (OCM).

Based on the output wavelength information output from the monitors 141-14M, the CPU 150 operates as a detector that detects optical signals that include the same wavelength, among the optical signals output from the wavelength selective switches 111-11M to the optical coupler 120.

Further, the CPU 150 operates as an output unit that outputs detection results indicating the optical signals that include the same wavelength. For example, the CPU 150 transmits to a network management system (NMS), a wavelength collision message indicating that optical signals of the same wavelength have collided in the optical switching device 100. The CPU 150 transmits the wavelength collision message to the NMS via a communications interface (not depicted). Thus, a wavelength collision message can be transmitted to the NMS, if optical signals of the same wavelength are input to the optical coupler 120 consequent to setting errors at the transmitting device, device failure along the path, or shifts in the wavelength of a signal from a transmitter, etc.

Further, if optical signals of the same wavelength are detected, the CPU 150 may further operate as a controller that causes any one of the wavelength selective switches (among the wavelength selective switches 111-11M) that are outputting the optical signals of the same wavelength, to terminate output of the optical signal. For example, the CPU 150 causes any one of the wavelength selective switches to terminate output of the optical signal, by outputting a block signal thereto. The block signal includes information indicating the wavelength whose output is to be terminated. If the CPU 150 outputs a block signal, the wavelength selective switch 111-11M that receives the block signal terminates output of the optical signal of the wavelength included in the block signal.

Consequently, if optical signals of the same wavelength collide in the optical switching device 100, any one of the optical signals can be automatically blocked. As a result, even if optical signals of the same wavelength are output from the optical switching device 100 as a WDM signal, the inability to receive the optical signals at any of the receiving side devices can be prevented.

Further, the optical switching device 100 may include memory 160. The memory 160, for example, is storage storing therein a priority level for each of the wavelength selective switches 111-11M. The priority levels of the wavelength selective switches 111-11M are preliminarily set based on the importance of the circuits that the wavelength selective switches 111-11M accommodate.

Among the wavelength selective switches that have output optical signals of the same wavelength, the CPU 150 refers to the memory 160 and causes the wavelength selective switch that has the lower priority level to terminate output of the optical signal. Consequently, if optical signals of the same wavelength collide in the optical switching device 100, the optical signal output from the wavelength selective switch having the lower priority level can be automatically blocked. Thus, the optical signal output from a wavelength selective switch having a high priority level among the wavelength selective switches outputting the optical signals that collide, can be transmitted normally.

Further, the memory 160 may store therein a priority level for each of the optical signals input to the wavelength selective switches 111-11M. The priority level of an optical signal is preliminarily set based on, for example, the contents of the optical signal. For example, if the contents of an optical signal are for a dedicated line, the priority level of the optical signal is set relatively high. Further, if the contents of an optical signal are for a common circuit or a leased wavelength, etc., the priority level of the optical signal is set relatively low.

Further, the priority levels of the optical signals may be set based on signal type. For example, if the signal type is Synchronous Optical Network/Synchronous Digital Hierarchy (SONET/SDH), the priority level of the optical signal is set relatively high. If the signal type is Ethernet (registered trademark), the priority level of the optical signal is set relatively low. The type of each optical signal may be preliminarily stored in the memory 160 according to signal, may be determined by the CPU 150, etc.

The priority levels of the optical signals may be preliminarily set based on the bit rate of each optical signal. For example, if the bit rate is relatively high, the priority level for the optical signal is set relatively high. If the bit rate is relatively low, the priority level of the optical signal is set relatively low. The bit rate of each optical signal may be preliminarily stored in the memory 160 according to signal, determined by the CPU 150, determined by spectral width measurement by the monitors 141-14M (OCM), etc.

Among the wavelength selective switches that have output optical signals of the same wavelength, the CPU 150 refers to the memory 160 and causes the wavelength selective switch that output the optical signal of the lower priority level to terminate output of the optical signal. Consequently, if optical signals of the same wavelength collide in the optical switching device 100, among the optical signals, the optical signal of the lower priority can be automatically blocked. As a result, among optical signals that collide, an optical signal of a high priority can transmitted normally.

Figure 2:
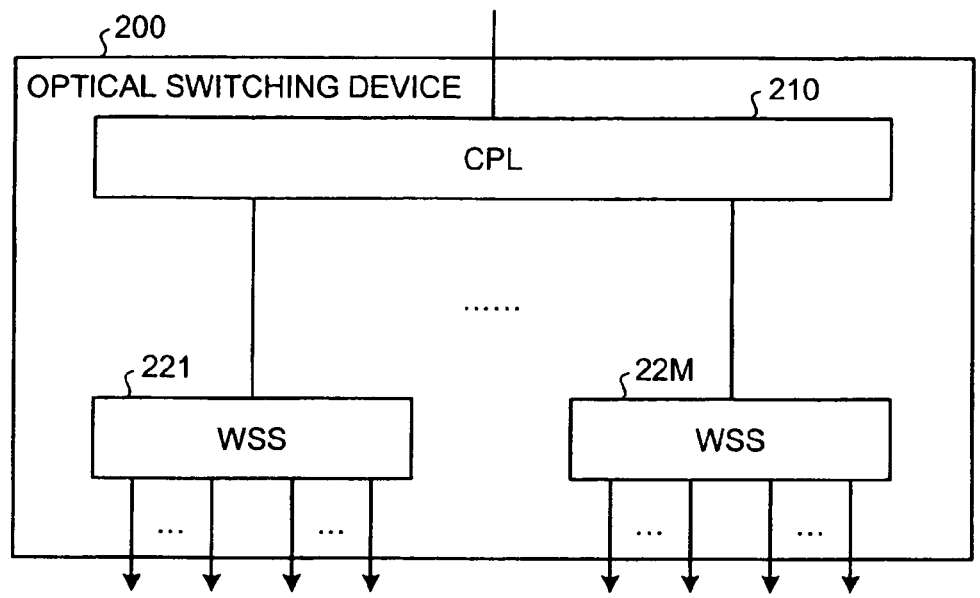
FIG. 2 is a diagram of another example of the optical switching device according to the embodiment.

FIG. 2 is a diagram of another example of the optical switching device according to the embodiment. As depicted in FIG. 2, an optical switching device 200 according to the embodiment includes an optical coupler 210 and M wavelength selective switches 221-22M. The wavelength selective switches 221-22M respectively have an input port (first port) and plural output ports (second ports). Optical signals that are output by the wavelength selective switches 221-22M may be WDM signals of plural wavelengths that have been multiplexed or may be signals that include only 1 wavelength.

The optical coupler 210 has plural output ports (third ports on the output side) to which the respective input ports (first ports) of the wavelength selective switches 221-22M are optically coupled. The optical coupler 210 splits an input optical signal and outputs the resulting optical signals to the input ports of the wavelength selective switches 221-22M, respectively.

Like the optical switching device 200, a wavelength selective switch having a large number of output ports can be easily realized by optically coupling the output ports (third ports) of the optical coupler 210 to the input ports (first ports) of the wavelength selective switches 221-22M, respectively.

The optical coupler 210 may have more output ports than the number (M) of the wavelength selective switches 221-22M, whereby the number of output ports of the optical switching device 200 can be easily increased by optically coupling a wavelength selective switch to the optical coupler 210. Further, for example, initial costs can be suppressed at the initial operation state, by reducing the number of wavelength selective switches 221-22M.

In addition, by optically coupling a new wavelength selective switch to the optical coupler 210, the number of output ports can be increased even while in service. Therefore, for example, unlike replacing the wavelength selective switch with one that has a larger number of output ports, the number of output ports can be increased without interruptions in service.

The optical switching device 200 can be applied to an optical drop device that drops (splits) optical signals in units of wavelength, for example. In this case, an optical signal from a given degree of a network is input to the optical coupler 210 of the optical drop device to which the optical switching device 200 is applied. Further, optical paths are disposed to the optical drop device, whereby optical signals output from the output ports of the optical coupler 210 are output to plural receivers and degrees different from the given degree.

As depicted by FIGS. 1A and 2, a wavelength selective switch having a large number of ports can be easily realized by optically coupling the third ports of the optical coupler to the first port of each wavelength selective switch. Further, by providing the optical coupler with third ports that are greater in number than the number of wavelength selective switches, the number of ports can be easily increased by newly optically coupling a wavelength selective switch to the optical coupler.

Figure 3:
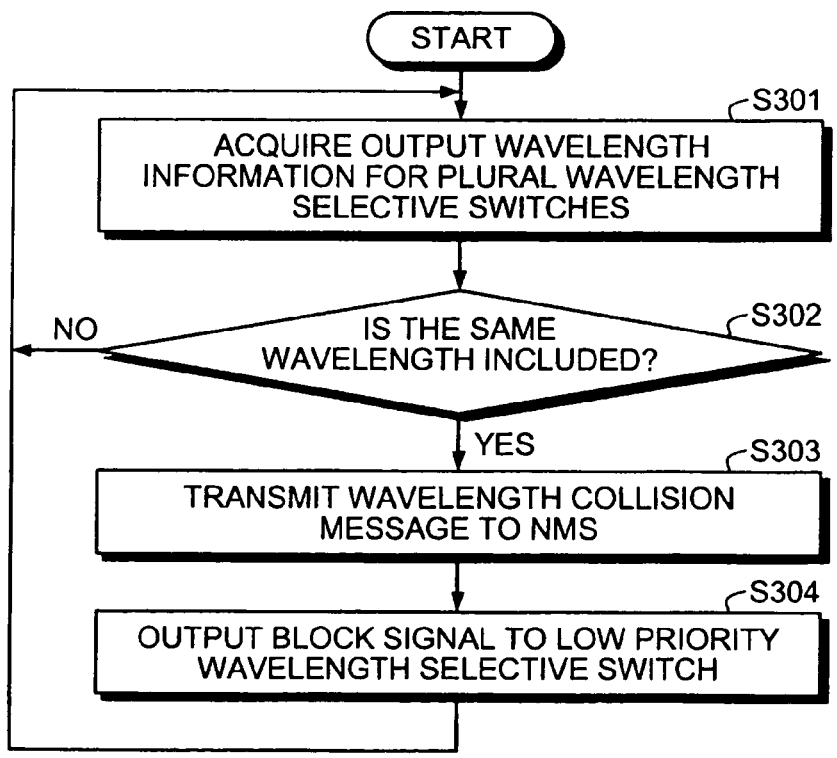
FIG. 3 is a flowchart of an example of exclusion control performed by the CPU.

FIG. 3 is a flowchart of an example of exclusion control performed by the CPU. The CPU 150 acquires from the monitors 141-14M, output wavelength information for the wavelength selective switches 111-11M (step S301). Next, the CPU 150 determines whether identical wavelengths are included among the wavelengths indicated by the output wavelength information acquired at step S301 (step S302).

At step S302, if identical wavelengths are not included (step S302: NO), the CPU 150 returns to step S301. If identical wavelengths are included (step S302: YES), the CPU 150 transmits a wavelength collision message to the NMS (step S303). Next, the CPU 150 outputs a block signal to the wavelength selective switch having the lower priority among the wavelength selective switches that correspond to the output wavelength information that includes the same wavelength (step S304), and the CPU 150 returns to step S301.

Figure 4:
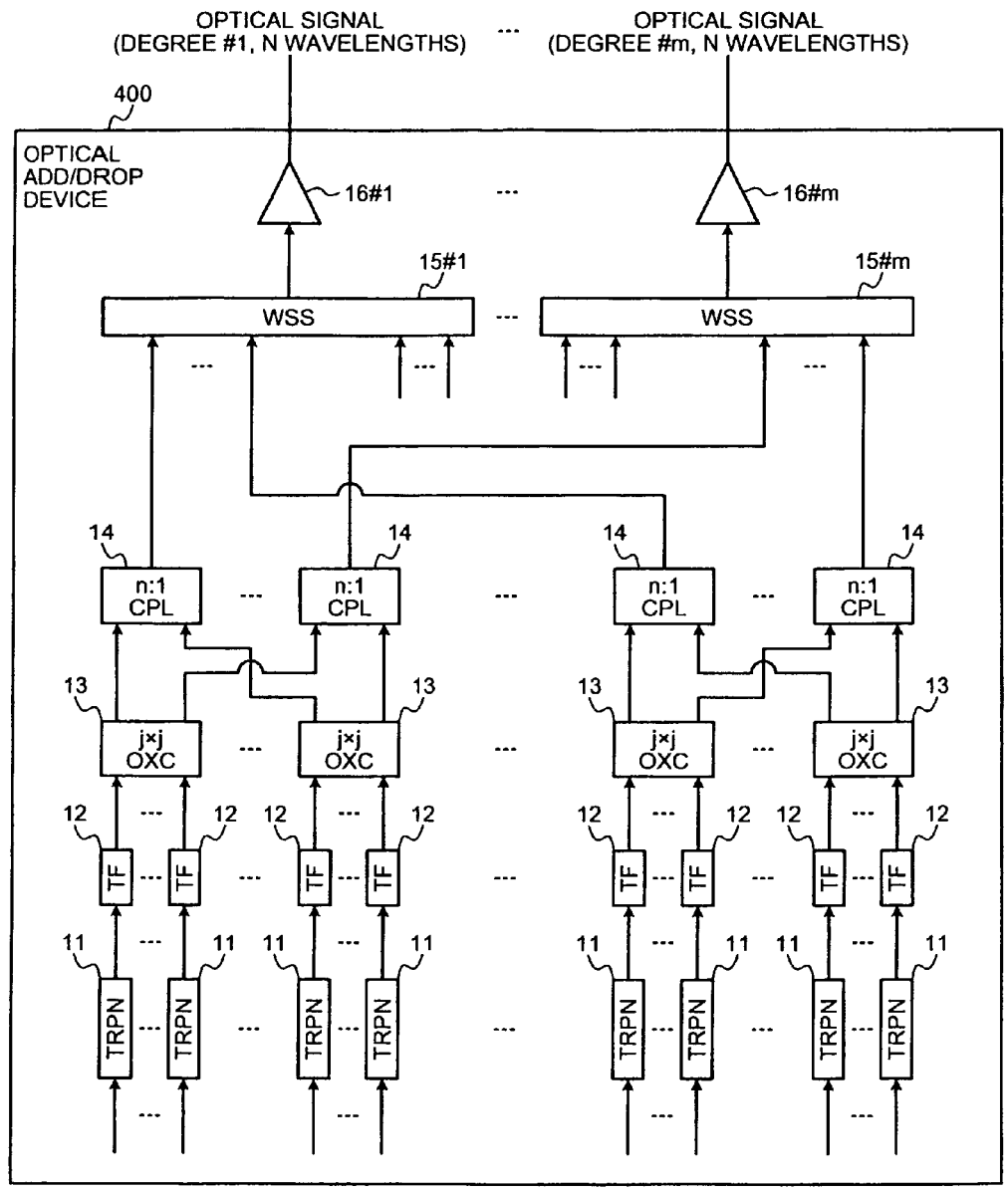
FIG. 4 is a diagram of a first example of an optical add/drop device to which the optical switching device depicted in FIGS. 1A, 1B is applied.

FIG. 4 is a diagram of a first example of an optical add/drop device to which the optical switching device depicted in FIGS. 1A, 1B is applied. An optical add/drop device 400 depicted in FIG. 4 is an example of an optical add/drop device to which the optical switching device 100 depicted in FIG. 1A or FIG. 1B has been applied. The optical add/drop device 400 is an OADM that adds and drops signals with respect to wavelength division multiplexed light. However, in FIG. 4, a configuration for performing the adding of an optical signal in the optical add/drop device 400 is depicted.

The optical add/drop device 400 is assumed to output optical signals to m degrees (e.g., 8 degrees). Further, in each optical signal output to the degrees by the optical add/drop device 400, optical signals of a maximum of N wavelengths (96 wavelengths) are assumed to be wavelength division multiplexed. The channel count on the network-side is assumed to be a maximum of N×m (e.g., 96×8=768).

The optical add/drop device 400 includes an adder having CDC function. For example, the optical add/drop device 400 includes multiple transponders (TRPN) 11, multiple tunable filters (TF) 12, multiple cross connects (OXC) 13, multiple couplers (CPL) 14, m wavelength selective switches 15#1-15#m, and m amplifiers 16#1-16#m. The optical switching device 100 depicted in FIG. 1A or FIG. 1B, for example, can be applied to the wavelength selective switches 15#1-15#m, respectively.

The client-side transponders 11 (transmitters) output optical signals to the tunable filters 12, respectively. The tunable filters 12 narrow the band of the optical signals output from the transponders 11 and output the resulting optical signals to the cross connects 13, respectively.

The cross connects 13 respectively switch the paths of the optical signals output from the tunable filters 12 and output to the couplers 14, the optical signals whose paths have been switched, whereby optical signals from the client-side are distributed to the m degrees. Further, the cross connects 13 may respectively have a multicast function and may be capable of coupling and distributing the optical signals.

The couplers 14 are respectively n:1 couplers that couple the n optical signals output from the cross connects 13. The couplers 14 output the coupled optical signals to the wavelength selective switches 15#1-15#m, respectively, whereby the optical signals distributed by the cross connects 13 are coupled as a WDM signal of a maximum of N wavelengths and input to the wavelength selective switches 15#1-15#m.

The wavelength selective switches 15#1-15#m are disposed respectively corresponding to the degrees #1-#m. The wavelength selective switches 15#1-15#m select and couple optical signals of a given wavelength included among the optical signals input thereto and output the coupled optical signals to the amplifiers 16#1-16#m, respectively.

The m optical signals (add) from the couplers 14 and the m−1 optical signals (through) from the other degrees (#2-#m) are input to the wavelength selective switch 15#1. Similarly, the m optical signals from the couplers (add) and the m−1 optical signals from the other degrees (through) are input to the wavelength selective switches 15#2-15#m.

In this manner, in the optical add/drop device 400 having CDC function, a large number of input ports are provided to the wavelength selective switches 15#1-15#m. Meanwhile, by applying the optical switching device 100 to the wavelength selective switches 15#1-15#m, the number of the respective input ports of the wavelength selective switches 15#1-15#m can be easily secured.

Further, by applying the optical switching device 100 to the wavelength selective switches 15#1-15#m, the number of optical devices transmitting the optical signals (add) from the client-side and the number of optical devices transmitting optical signals (through) from the other degrees (#2-#m) are the same, enabling variations in optical signal characteristics to be suppressed between routes along which the optical signals pass through multiple optical devices.

The amplifiers 16#1-16#m amplify the optical signals output from the wavelength selective switches 15#1-15#m and output the amplified optical signals to the degrees #1-#m, respectively. Configuration may be such that the amplifiers are disposed on the optical paths between the couplers 14 and the wavelength selective switches 15#1-15#m to compensate optical signal loss. The number of degrees, the number of wavelengths included in the wavelength division multiplexed light, the number of switch ports, the splitting ratio of the couplers, the position of the amplifiers, etc. depicted in FIG. 4 represent one example. Therefore, various modifications to the configuration depicted in FIG. 4 are possible.

According to the optical add/drop device 400 depicted in FIG. 4, 100% add/drop is supported with respect to the network-side N×m (e.g., 768) channels. Therefore, the client-side has N×m (e.g., 768) channels.

Further, according to the optical add/drop device 400, by using devices that are not wavelength dependent such as the cross connects 13 and the couplers 14, a wavelength of the optical signals from the client-side can be arbitrarily selected (colorless). By optically coupling the couplers 14 to the wavelength selective switch 15 of each degree, directional dependency of the degrees can be eliminated (directionless). Moreover, by sending a particular wavelength to an arbitrary degree by the cross connects 13, control can be performed such that signals of the same wavelength do not collide along a degree on the network-side (contentionless).

In the optical add/drop device 400, since the optical signals do not pass a device having a passband restriction, gridless schemes, which vary the passband of the wavelength selective switch according to the transmission route of the optical signal, can also be supported. Gridless schemes have been disclosed in non-patent literature such as by Tibuleac, S. in "ROADM Network Design Issues", OFC/NFOEC, 2009.

Figure 5:
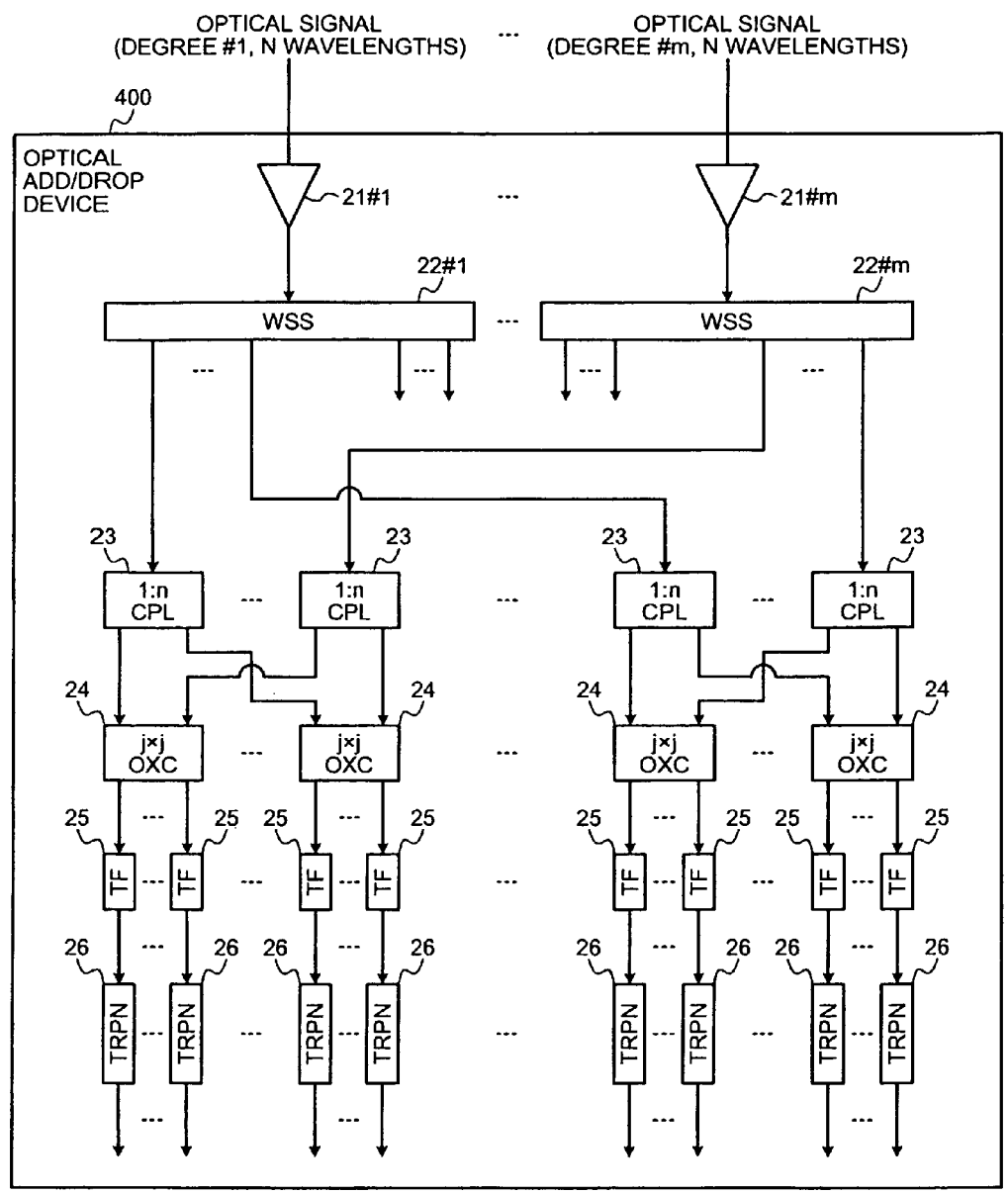
FIG. 5 is a diagram of a first example of an optical add/drop device to which the optical switching device depicted in FIG. 2 is applied.

FIG. 5 is a diagram of a first example of an optical add/drop device to which the optical switching device depicted in FIG. 2 is applied. The optical add/drop device 400 depicted in FIG. 5 is an example of an optical add/drop device to which the optical switching device 200 depicted in FIG. 2 has been applied. The optical add/drop device 400 is an OADM that adds and drops signals with respect to wavelength division multiplexed light. However, in FIG. 5, a configuration for performing the dropping of an optical signal in the optical add/drop device 400 is depicted.

The optical add/drop device 400 is assumed to receive optical signals from m degrees (e.g., 8 degrees). Further, in each optical signal input to the optical add/drop device 400 from the degrees, optical signals of a maximum of N wavelengths (e.g., 96 wavelengths) are assumed to be wavelength division multiplexed. The channel count on the network-side is assumed to be a maximum of N×m (e.g., 96×8=768).

The optical add/drop device 400 includes a splitter having CDC function. For example, the optical add/drop device 400 includes m amplifiers 21#1-21#m, m wavelength selective switches 22#1-22#m, multiple couplers 23, multiple cross connects 24, multiple tunable filters 25, and multiple transponders 26. The optical switching device 200 FIG. 2, for example, can be applied to the wavelength selective switches 22#1-22#m.

The amplifiers 21#1-21#m amplify optical signals from the degrees #1-#m and output the amplified optical signals to the wavelength selective switches 22#1-22#m, respectively. The wavelength selective switches 22#1-22#m separate each optical signal output from the amplifiers 21#1-21#m into multiple optical signals, according to wavelength.

From the wavelength selective switch 22#1, an optical signal (drop) to the coupler 23 and m−1 optical signals (through) to the other degrees (#2-#m) are output. Similarly, from the wavelength selective switches 22#2-22#m, m optical signals (drop) to the couplers and m−1 optical signals (through) to the other degrees are output.

In this manner, in the optical add/drop device 400 having CDC function, a large number of output ports are provided to the wavelength selective switches 22#1-22#m. Meanwhile, by applying the optical switching device 200 to the wavelength selective switches 22#1-22#m, the number of respective output ports of the wavelength selective switches 22#1-22#m can be easily secured.

Further, by applying the optical switching device 200 to the wavelength selective switches 22#1-22#m, the number of devices transmitting the optical signals (drop) to the client-side and the number of devices transmitting the optical signals (through) to the other degrees (#2-#m) are the same, enabling variations in optical signal characteristics to be suppressed between routes along which the optical signal pass through multiple optical devices.

The couplers 23 are 1:n splitters that split the optical signals output from the wavelength selective switches 22#1-22#m into n optical signals. The couplers 23 output the resulting n optical signals to the cross connects 24.

The cross connects 24 switch the paths of the optical signals output from the couplers 23. The cross connects 24 output to the tunable filters 25, respectively, the optical signals whose paths have been switched.

The tunable filters 25 extract a given wavelength from the optical signals output from the cross connects 24. The given wavelength extracted by the tunable filters 25 can be changed by setting. The tunable filters 25 output the extracted optical signals of the given wavelength to the transponders 26, respectively. Consequently, the extraction and reception of an optical signal of an arbitrary wavelength is enabled.

The transponders 26 (receivers) receive the optical signals output from the tunable filters 25, respectively. The number of degrees, the number of wavelengths included in the wavelength division multiplexed light, the number of switch ports, the splitting ratio of the couplers, the position of the amplifiers, etc. depicted in FIG. 5 represent one example. Therefore, various modifications to the configuration depicted in FIG. 5 are possible.

According to the optical add/drop device 400 depicted in FIG. 5, optical signals from the degrees can be distributed to a group on the client-side by using the wavelength selective switches 22#1-22#m. Further, an optical signal from any one of the degrees can be selected to be dropped using the cross connects 24. Further, by selectively removing an optical signal using the tunable filters 25, collisions of the same signal can be prevented (contentionless) without wavelength or directional dependencies (colorless, directionless).

In the optical add/drop device 400, since the optical signals do not pass a device having a passband restriction, gridless schemes, which vary the passband of the wavelength selective switch according to the transmission route of the optical signal, can also be supported.

Figure 6:
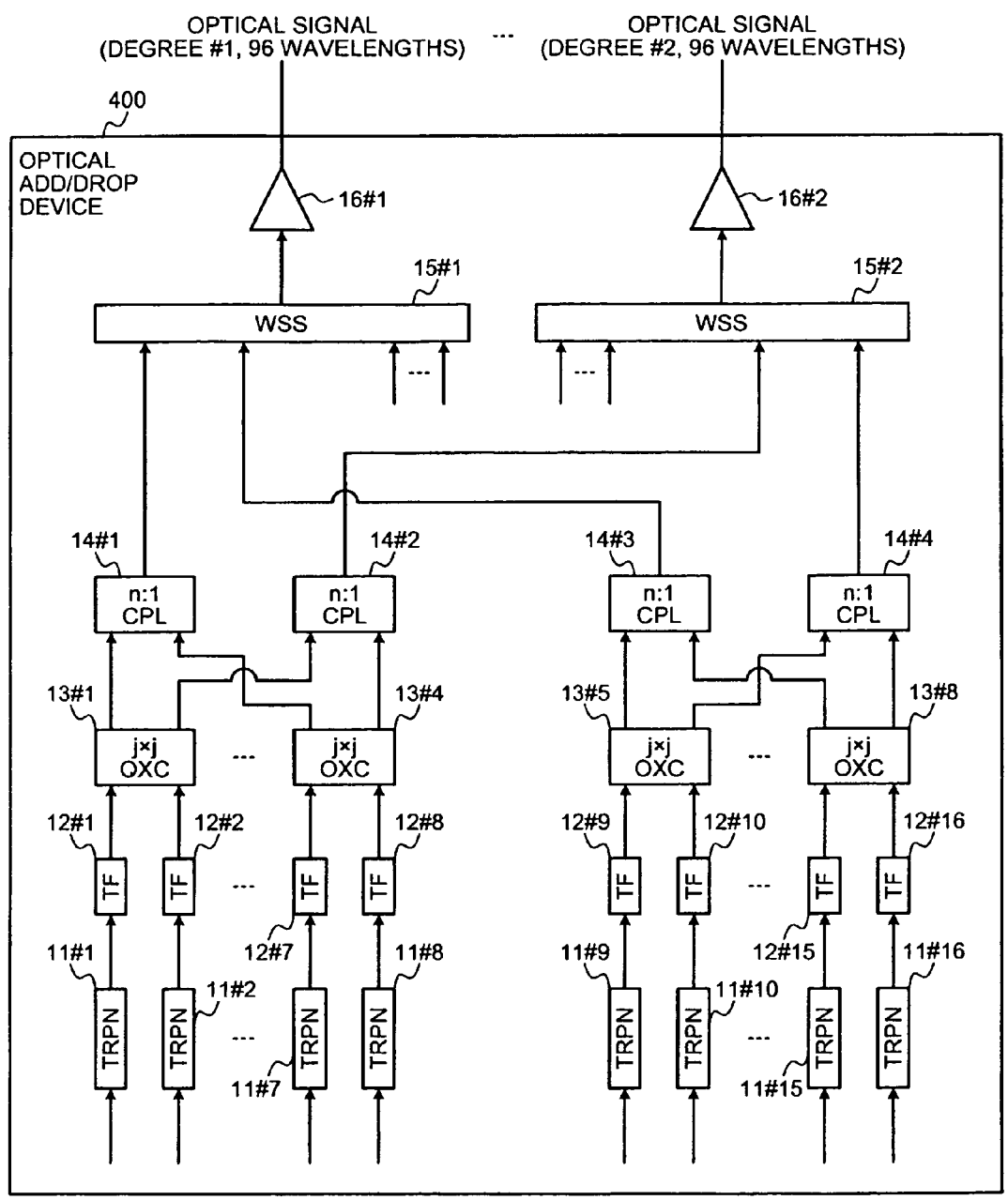
FIG. 6 is a diagram of an example of an initial operation state of the optical add/drop device depicted in FIG. 4.

FIG. 6 is a diagram of an example of an initial operation state of the optical add/drop device depicted in FIG. 4. The optical add/drop device 400 depicted in FIG. 6 assumes a configuration in which N=96 wavelengths, m=2 degrees, and the client-side channel count is 16 in the optical add/drop device 400 depicted in FIG. 4. In this example, the optical add/drop device 400 includes 16 transponders 11#1-11#16, 16 tunable filters 12#1-12#16, 8 cross connects 13#1-13#8, 4 couplers 14#1-14#4, 2 wavelength selective switches 15#1-15#2, and 2 amplifiers 16#1-16#2.

Further, in this example, the cross connects 13#1-13#8 can be assumed as 2×2 cross connects. However, to provide for future expansion, here, the cross connects 13#1-13#8 are assumed as j×j cross connects, enabling increases in the client-side channel count, increases in the number of degrees, etc., while in service.

The couplers 14#1-14#4 can be assumed as 4:1 couplers. However, to provide for future expansion, here, the couplers 14#1-14#4 are assumed as n:1 (e.g., 12:1) couplers, enabling increases in the client-side channel count, increases in the number of degrees, etc., while in service.

Figure 7:
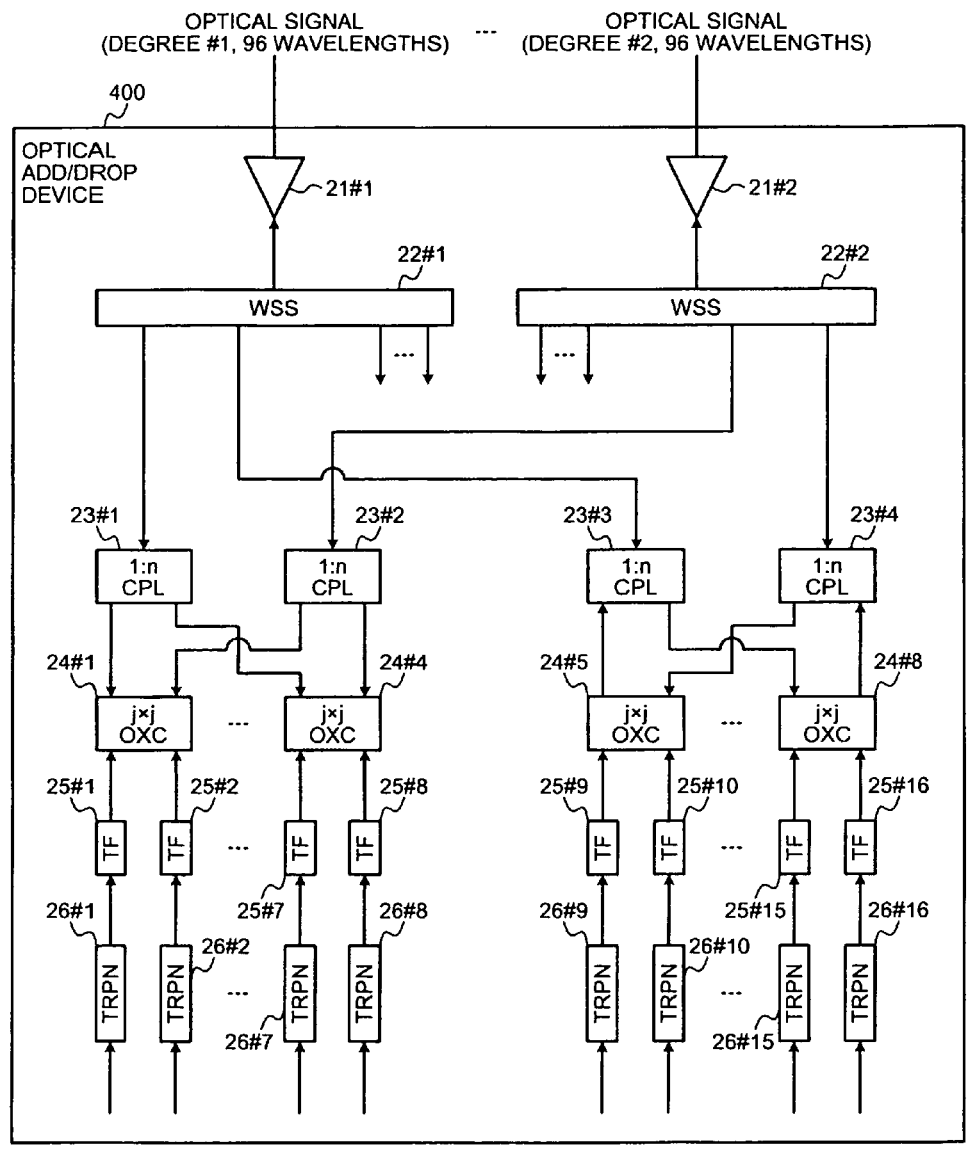
FIG. 7 is a diagram of an example of an initial operation state of the optical add/drop device depicted in FIG. 5.

FIG. 7 is a diagram of an example of an initial operation state of the optical add/drop device depicted in FIG. 5. The optical add/drop device 400 depicted in FIG. 7 assumes a configuration in which N=96 wavelengths, m=8 degrees, and the client-side channel count is 16 in the optical add/drop device 400 depicted in FIG. 5. The optical add/drop device 400 includes 2 amplifiers 21#1-21#2, 2 wavelength selective switches 22#1-22#2, 4 couplers 23#1-23#4, 8 cross connects 24#1-24#8, 16 tunable filters 25#1-25#16, and 16 transponders 26#1-26#16.

In this example, the cross connects 24#1-24#8 can be assumed as 2×2 cross connects. However, to provide for future expansion, here, the cross connects 24#1-24#8 are assumed as j×j cross connects, enabling increases in the client-side channel count, increases in the number of degrees, etc., while in service.

The couplers 23#1-23#4 can be assumed as 1:4 couplers. However, to provide for future expansion, here, the couplers 23#1-23#4 are assumed as 1:n (e.g., 1:12) couplers, enabling increases in the client-side channel count, increases in the number of degrees, etc., while in service.

Figure 8:
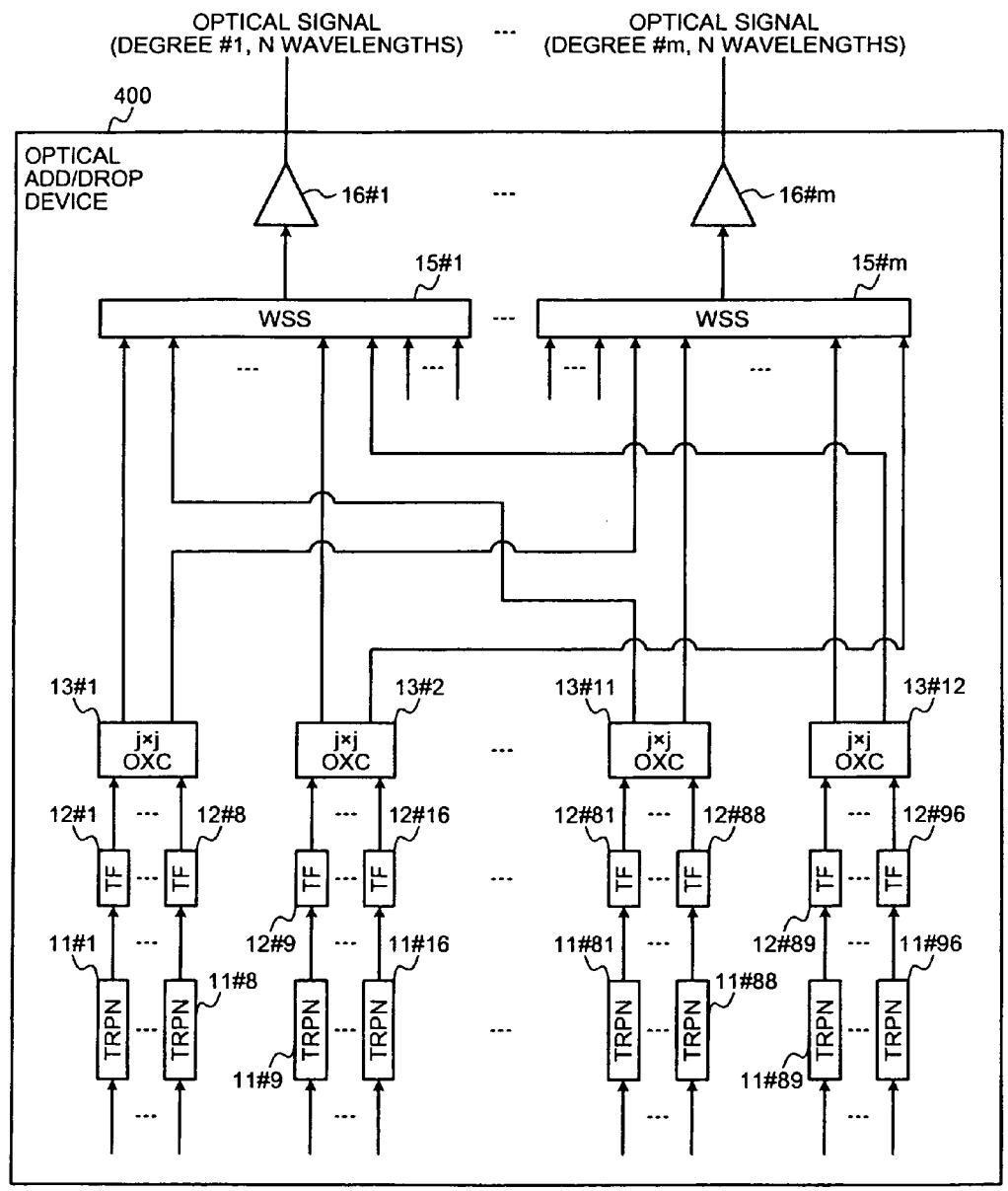
FIG. 8 is a diagram of an example of modification of the optical add/drop device depicted in FIG. 4.

FIG. 8 is a diagram of an example of modification of the optical add/drop device depicted in FIG. 4. The optical add/drop device 400 depicted in FIG. 8 is a modified example of the optical add/drop device 400 depicted in FIG. 4. If the client-side channel count is restricted to 96 channels when the network-side channel count is N×m (96×8=768), as depicted in FIG. 8, in the optical add/drop device 400 depicted in FIG. 4, the couplers 14 may be omitted. In this case, the cross connects 13 and the wavelength selective switches 15#1-15#m are optically coupled.

Therefore, the optical add/drop device 400 includes 96 transponders 11#1-11#96, 96 tunable filters 12#1-12#96, 12 cross connects 13#1-13#12, m wavelength selective switches 15#1-15#m, and m amplifiers 16#1-16#m. In this case, 12.5% add is possible with respect to the channels on the network-side.

Figure 9:
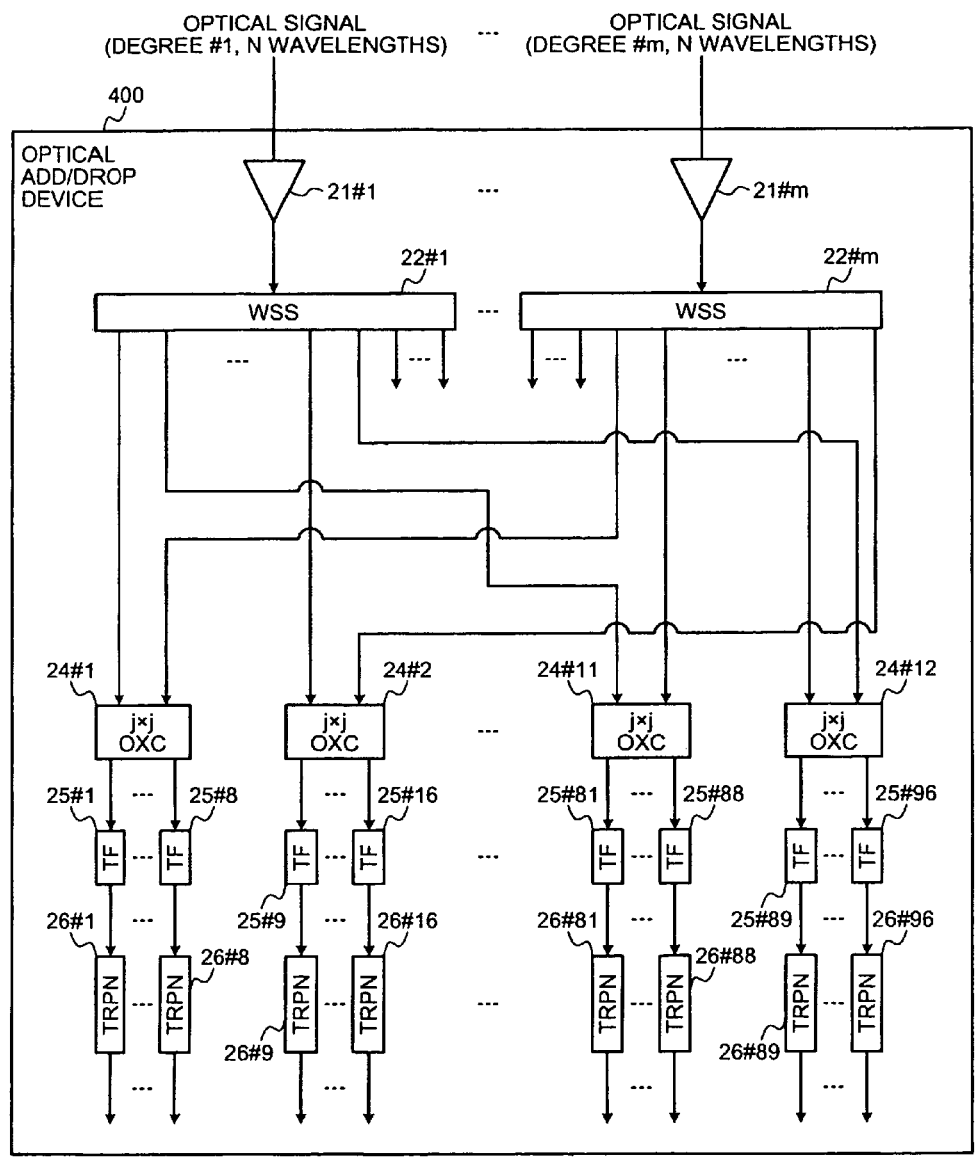
FIG. 9 is a diagram of an example of modification of the optical add/drop device depicted in FIG. 5.

FIG. 9 is a diagram of an example of modification of the optical add/drop device depicted in FIG. 5. The optical add/drop device 400 depicted in FIG. 9 is a modified example of the optical add/drop device 400 depicted in FIG. 5. If the client-side channel count is restricted to 96 channels when the network-side channel count is N×m (96×8=768), as depicted in FIG. 9, in the optical add/drop device 400 depicted in FIG. 5, the couplers 23 may be omitted. In this case, the wavelength selective switches 22#1-22#m and the cross connects 24 are optically coupled.

Therefore, the optical add/drop device 400 includes m amplifiers 21#1-21#m, m wavelength selective switches 22#1-22#m, 12 cross connects 24#1-24#12, 96 tunable filters 25#1-25#96, and 96 transponders 26#1-26#96. In this case, 12.5% drop is possible with respect to the channels on the network-side.

In the configuration depicted in FIG. 9, since the optical signals output from the cross connects 24#1-24#12 are signals of 1 wavelength, the tunable filters 25#1-25#96 may be further omitted. In this case, the cross connects 24#1-24#12 and the transponders 26#1-26#96 are optically coupled.

Figure 10:
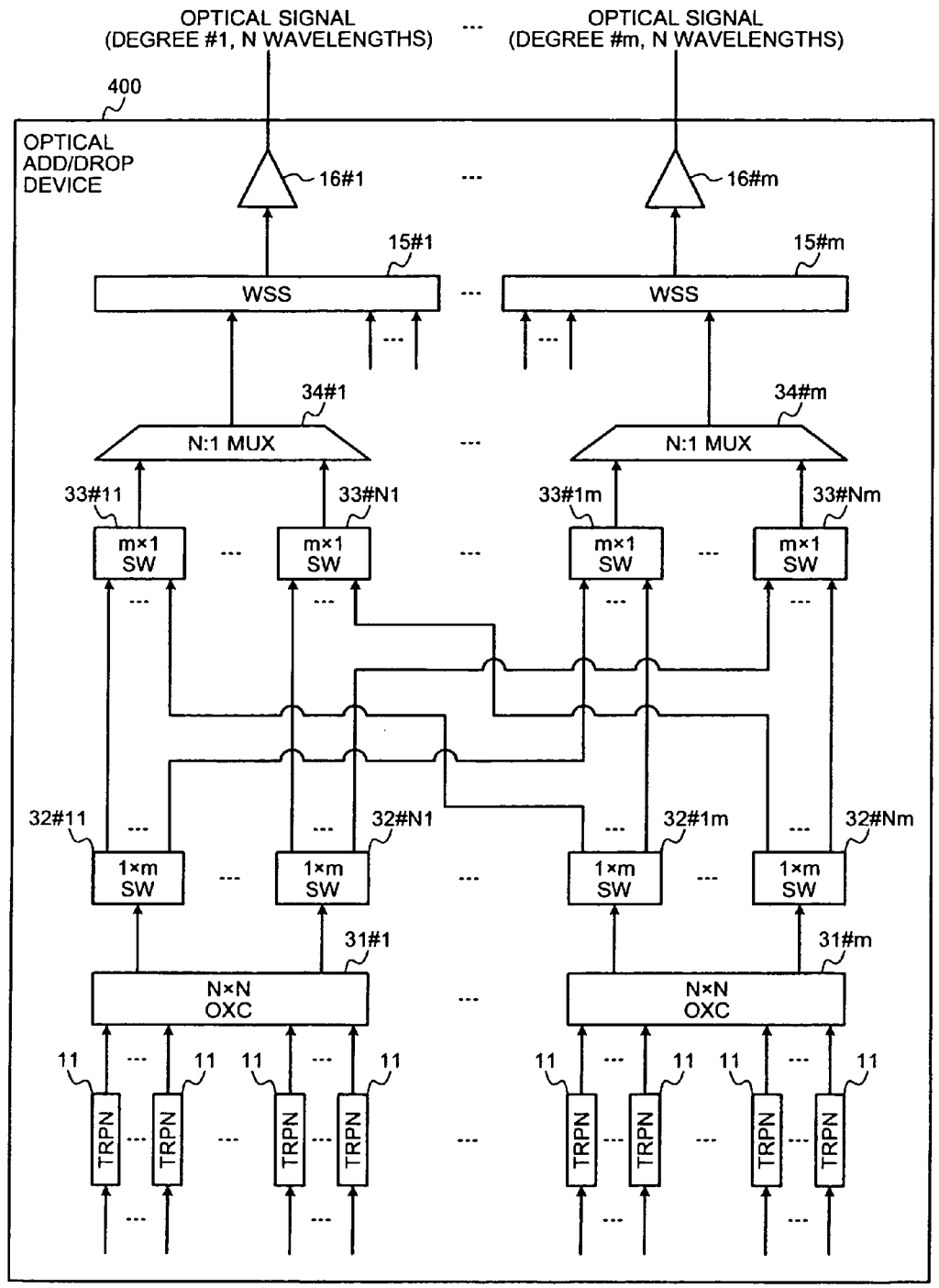
FIG. 10 is a diagram of a second example of the optical add/drop device to which the optical switching device depicted in FIGS. 1A, 1B is applied.

FIG. 10 is a diagram of a second example of the optical add/drop device to which the optical switching device depicted in FIGS. 1A, 1B is applied. In FIG. 10, components identical to those depicted in FIG. 4 are given the same reference numerals used in FIG. 4 and description thereof will be omitted. As depicted in FIG. 10, the optical add/drop device 400 may include m cross connects 31#1-31#m, m×N switches 32#11-32#Nm (first switch), m×N switches 33#11-33#Nm (second switch), and m multiplexers (MUX) 34#1-34#m, in addition to the configuration depicted in FIG. 4. In this case, the cross connects 13 and the couplers 14 depicted in FIG. 4 may be omitted from the optical add/drop device 400.

The transponders 11 output optical signals to the cross connects 31#1-31#m, respectively. The cross connects 31#1-31#m are N×N switches that switch the paths of the optical signals output from the transponders 11. The cross connects 31#1-31#m each output to any one of the switches 32#11-32#N1, . . . , 32#1m-32#Nm, the optical signals whose paths have been switched.

The switches 32#11-32#N1, . . . , 32#1-32#Nm each output to any one of the switches 33#11-33#N1, . . . , 33#1m-33#Nm, the optical signals output from the cross connects 31#1-31#m. For example, the switch 32#11 outputs the optical signal from the cross connect 31#1 to any one of the switches 33#11, 33#12, . . . , 33#1m.

The switches 33#11-33#N1, . . . , 33#1m-33#Nm respectively output to the multiplexer 34#1-34#m, the optical signals from the switches 32#11-32#N1, . . . , 32#1m-32#Nm. For example, the switch 33#11 outputs to the multiplexer 34#1, the optical signal from the switch that output the optical signal among the switches 32#11, 32#12, . . . , 32#1m. Consequently, optical signals are distributed to the degrees.

The multiplexers 34#1-34#m respectively multiplex (wavelength division multiplex) the optical signals output from the switches 33#11-33#N1, . . . , 33#1m-33#Nm and output the resulting signal to the wavelength selective switches 15#1-15#m. For example, the multiplexer 34#1 multiplexes the optical signals from the switches 33#11-33#N1 and outputs the resulting optical signal to the wavelength selective switch 15#1.

The optical signal (add) from the multiplexer 34#1 and m−1 optical signals (through) from the other degrees (#2-#m) are input to the wavelength selective switch 15#1. Similarly, the optical signals (add) from the multiplexers 34#2-34#m and the m−1 optical signals (through) from the other degrees are input respectively to the wavelength selective switches 15#2-15#m.

In this manner, in the optical add/drop device 400, the client-side cross connects 31#1-31#m are provided and the network-side multiplexers 34#1-34#m are provided. Additionally, the switches 32#11-32#Nm and the switches 33#11-33#Nm are provided between the cross connects 31#1-31#m and the multiplexers 34#1-34#m. Consequently, optical signals can be distributed to the degrees by the cross connects 31#1-31#m, which are not wavelength dependent, the switches 32#11-32#Nm and the switches 33#11-33#Nm. Therefore, even if the multiplexers 34#1-34#m, which are wavelength dependent, are used, CDC function can be realized.

Furthermore, by using the switches 32#11-32#Nm and the switches 33#11-33#Nm, optical loss between the cross connects 31#1-31#m and the multiplexers 34#1-34#m can be suppressed.

Figure 11:
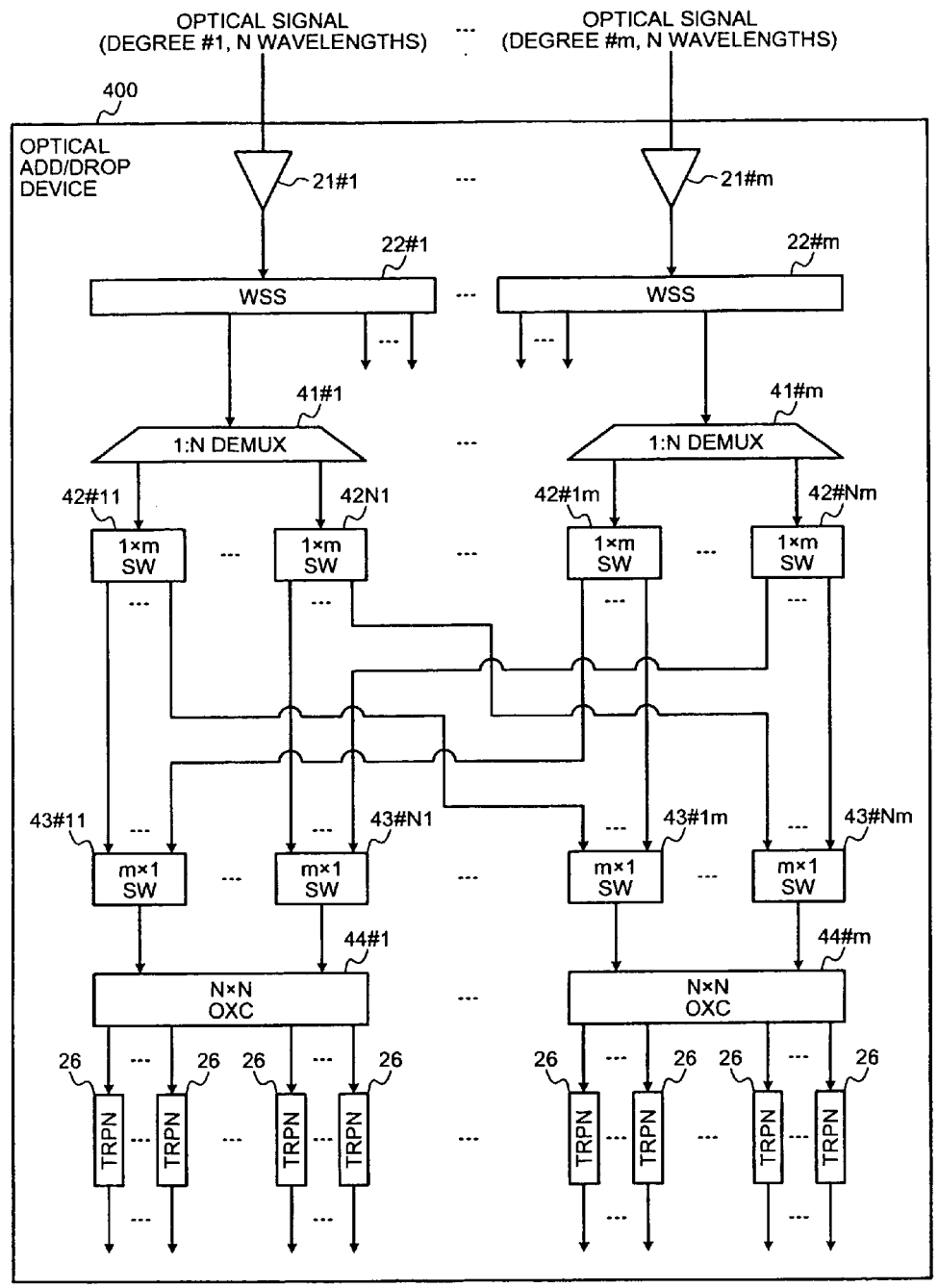
FIG. 11 is a diagram of a second example of the optical add/drop device to which the optical switching device depicted in FIG. 2 is applied.

FIG. 11 is a diagram of a second example of the optical add/drop device to which the optical switching device depicted in FIG. 2 is applied. In FIG. 11, components identical to those depicted in FIG. 5 are given the same reference numerals used in FIG. 5 and description thereof is omitted. As depicted in FIG. 11, the optical add/drop device 400 may include m demultiplexers 41#1-41#m, m×N switches 42#11-42#Nm (first switches), m×N switches 43#11-43#Nm (second switches), and m cross connects 44#1-44#m, in addition to the configuration depicted in FIG. 5. In this case, the couplers 23 and the cross connects 24 depicted in FIG. 5 may be omitted from the optical add/drop device 400.

The wavelength selective switch 22#1 outputs an optical signal (add) to the demultiplexer 41#1 and m−1 optical signals (through) to the other degrees (#2-#m). Similarly, wavelength selective switches 22#2-22#m output an optical signal (add) to the demultiplexers 41#2-41#m and m−1 optical signals (through) to the other degrees, respectively.

The demultiplexers 41#1-41#m demultiplex the optical signals output from the wavelength selective switches 22#1-22#m and output the resulting optical signals to the switches 42#11-42#N1, . . . , 42#1m-42#Nm. For example, the demultiplexer 41#1 demultiplexes the optical signal from the wavelength selective switch 22#1 and outputs the resulting optical signals to the switches 42#11-42#N1.

The switches 42#11-42#N1, . . . , 42#1m-42#Nm each output the optical signals from the demultiplexers 41#1-41#m, to any one of the switches 43#11-43#N1, . . . , 43#1m-43#Nm. For example, switch 42#11 outputs the optical signal from the demultiplexer 41#1, to any one of the switches 43#11, 43#12, . . . , 43#1m.

The switches 43#11-43#N1, . . . , 43#1m-43#Nm respectively output to the cross connects 44#1-44#m, the optical signals from the switches that have output the optical signals among the switches 42#11-42#N1, . . . , 42#1m-42#Nm. For example, the switch 43#11 outputs to cross connect 44#1, the optical signal that is from the switch that has output the optical signal, among the switches 42#11, 42#12, . . . , 42#1m.

The cross connects 44#1-44#m respectively are N×N switches that switch the paths of the optical signals output from the switches 43#11-43#N1, . . . , 43#1m-43#Nm. The cross connects 44#1-44#m output to the transponders, respectively, the optical signals whose paths have been switched.

In this manner, in the optical add/drop device 400, the cross connects 44#1-44#m are provided on the client-side, while the demultiplexers 41#1-41#m are provided on the network-side. The switches 43#11-43#Nm and the switches 42#11-42#Nm are provided between the cross connects 44#1-44#m and the demultiplexers 41#1-41#m. Consequently, optical signals from the degrees can be received at arbitrary transponders via the cross connects 44#1-44#m that are not wavelength dependent, the switches 43#11-43#Nm and the switches 42#11-42#Nm. Therefore, even if the demultiplexers 41#1-41#m, which are wavelength dependent, are used, CDC function can be realized.

Figure 12:
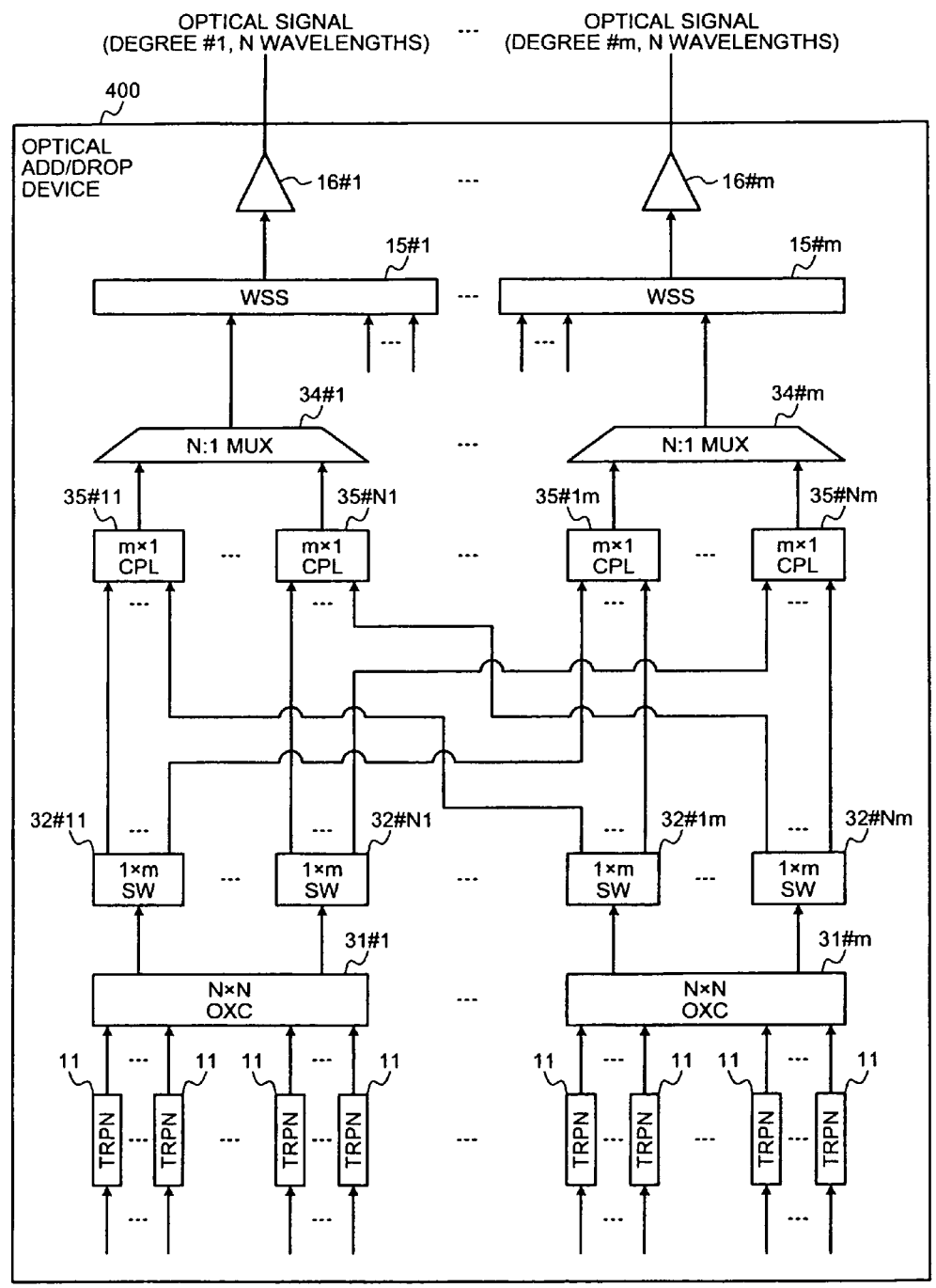
FIG. 12 is a diagram of a first example of modification of the optical add/drop device depicted in FIG. 10.

FIG. 12 is a diagram of a first example of modification of the optical add/drop device depicted in FIG. 10. In FIG. 1, components identical to those depicted in FIG. 10 are given the same reference numerals used in FIG. 10 and description thereof is omitted. As depicted in FIG. 12, in the optical add/drop device 400 depicted in FIG. 10, m×N couplers 35#11-35#Nm (second couplers) may be provided in place of the switches 33#11-33#Nm. The switches 32#11-32#N1, . . . , 32#1m-32#Nm each output to any one of the couplers 35#11-35#N1, . . . , 35#1m-35#Nm, the optical signals from the cross connects 31#1-31#m.

The couplers 35#11-35#N1, . . . , 35#1m-35#Nm couple the optical signals output from the switches 32#11-32#N1, . . . , 32#1m-32#Nm and output the resulting optical signals to the multiplexer 34#1-34#m, respectively. The multiplexers 34#1-34#m multiplex the optical signals output from the couplers 35#11-35#N1, . . . , 35#1m-35#Nm and output the multiplexed optical signals to the wavelength selective switches 15#1-15#m, respectively.

According to the optical add/drop device 400 depicted in FIG. 12, like the optical add/drop device 400 depicted in FIG. 10, even if the multiplexers 34#1-34#m, which are wavelength dependent, are used, CDC function can be realized.

Figure 13:
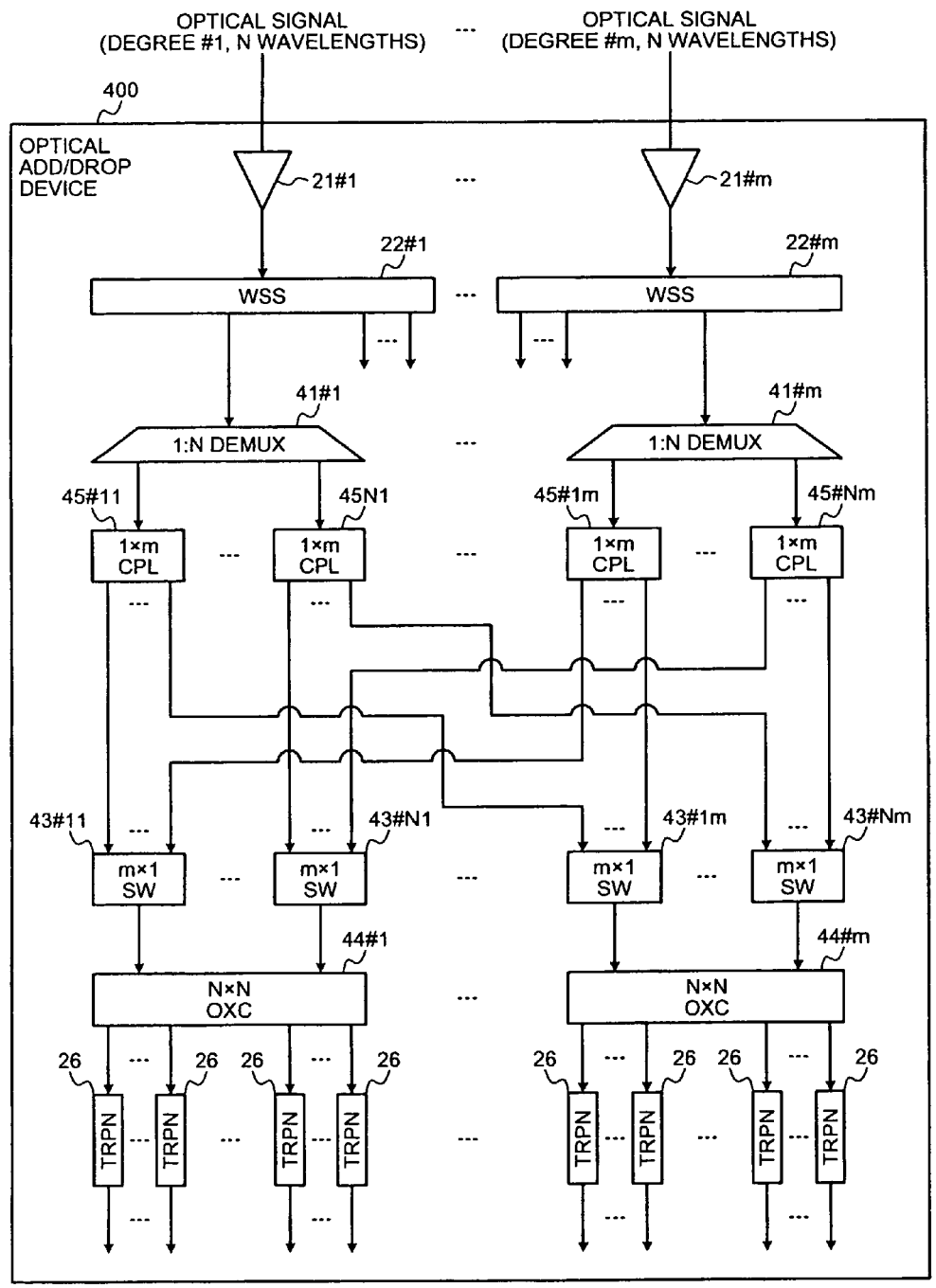
FIG. 13 is a diagram of a first example of modification of the optical add/drop device depicted in FIG. 11.

FIG. 13 is a diagram of a first example of modification of the optical add/drop device depicted in FIG. 11. In FIG. 13, components identical to those depicted in FIG. 11 are given the same reference numerals used in FIG. 11 and description thereof will be omitted. As depicted in FIG. 13, in the optical add/drop device 400 depicted in FIG. 11, m×N couplers 45#11-45#Nm (second couplers) may be provided in place of the switches 42#11-42#Nm. The demultiplexers 41#1-41#m demultiplex (wavelength division demultiplex) the optical signals output from the wavelength selective switches 22#1-22#m and output the resulting optical signals to the couplers 45#11-45#N1, . . . , 45#1m-45#Nm, respectively.

The couplers 45#11-45#N1, . . . , 45#1m-45#Nm each output to any one of the switches 43#11-43#N1, . . . , 43#1m-43#Nm, the optical signals output from the demultiplexers 41#1-41#m. The switches 43#11-43#N1, . . . , 43#1m-43#Nm output to the cross connects 44#1-44#m, the optical signals output from the couplers that have output the optical signals, among the couplers 45#11-45#N1, . . . , 45#1m-45#Nm.

According to the optical add/drop device 400 depicted in FIG. 13, like the optical add/drop device 400 depicted in FIG. 11, even if the demultiplexers 41#1-41#m, which are wavelength dependent, are used, CDC function can be realized.

Figure 14:
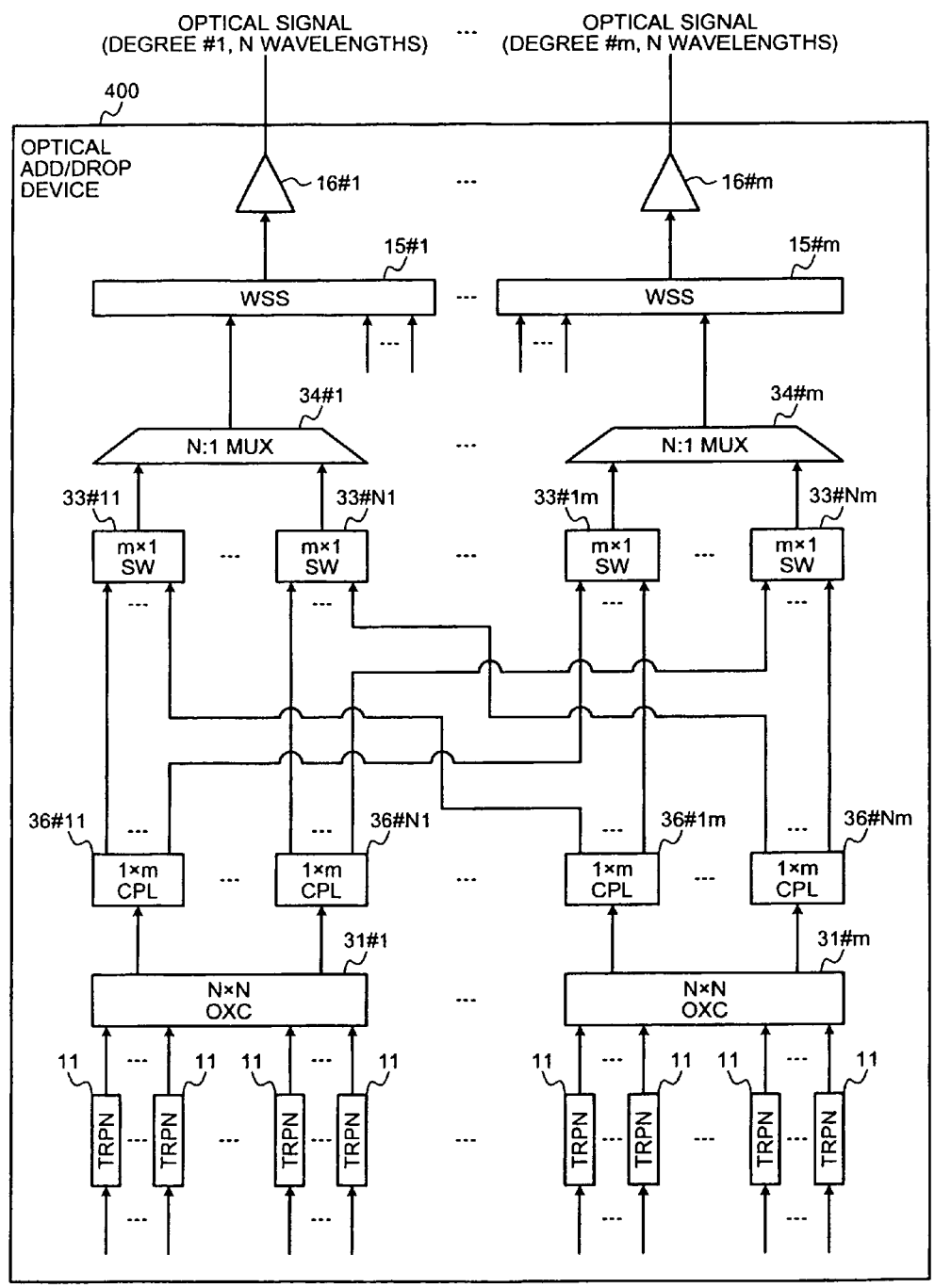
FIG. 14 is a diagram of a second example of modification of the optical add/drop device depicted in FIG. 10.

FIG. 14 is a diagram of a second example of modification of the optical add/drop device depicted in FIG. 10. In FIG. 14, components identical to those depicted in FIG. 10 are given the same reference numerals used in FIG. 10 and description thereof is omitted. As depicted in FIG. 14, in the optical add/drop device 400 depicted in FIG. 10, m×N couplers 36#11-36#Nm (second couplers) may be included in place of the switches 32#11-32#Nm. The cross connects 31#1-31#m each output the optical signals whose paths have been changed to any one of the couplers 36#11-36#N1, . . . , 36#1m-36#Nm.

The couplers 36#11-36#N1, . . . , 36#1m-36#Nm each output to any one of the switches 33#11-33#N1, . . . , 33#1m-33#Nm, the optical signals output from the cross connects that output the optical signals, among the cross connects 31#1-31#m. The switches 33#11-33#N1, . . . , 33#1m-33#Nm output to the multiplexers 34#1-34#m, the optical signals output from the couplers 36#11-36#N1, . . . , 36#1m-36#Nm.

According to the optical add/drop device 400 depicted in FIG. 14, like the optical add/drop device 400 depicted in FIG. 10, even if the multiplexers 34#1-34#m, which have wavelength dependency, are used, CDC function can be realized.

Figure 15:
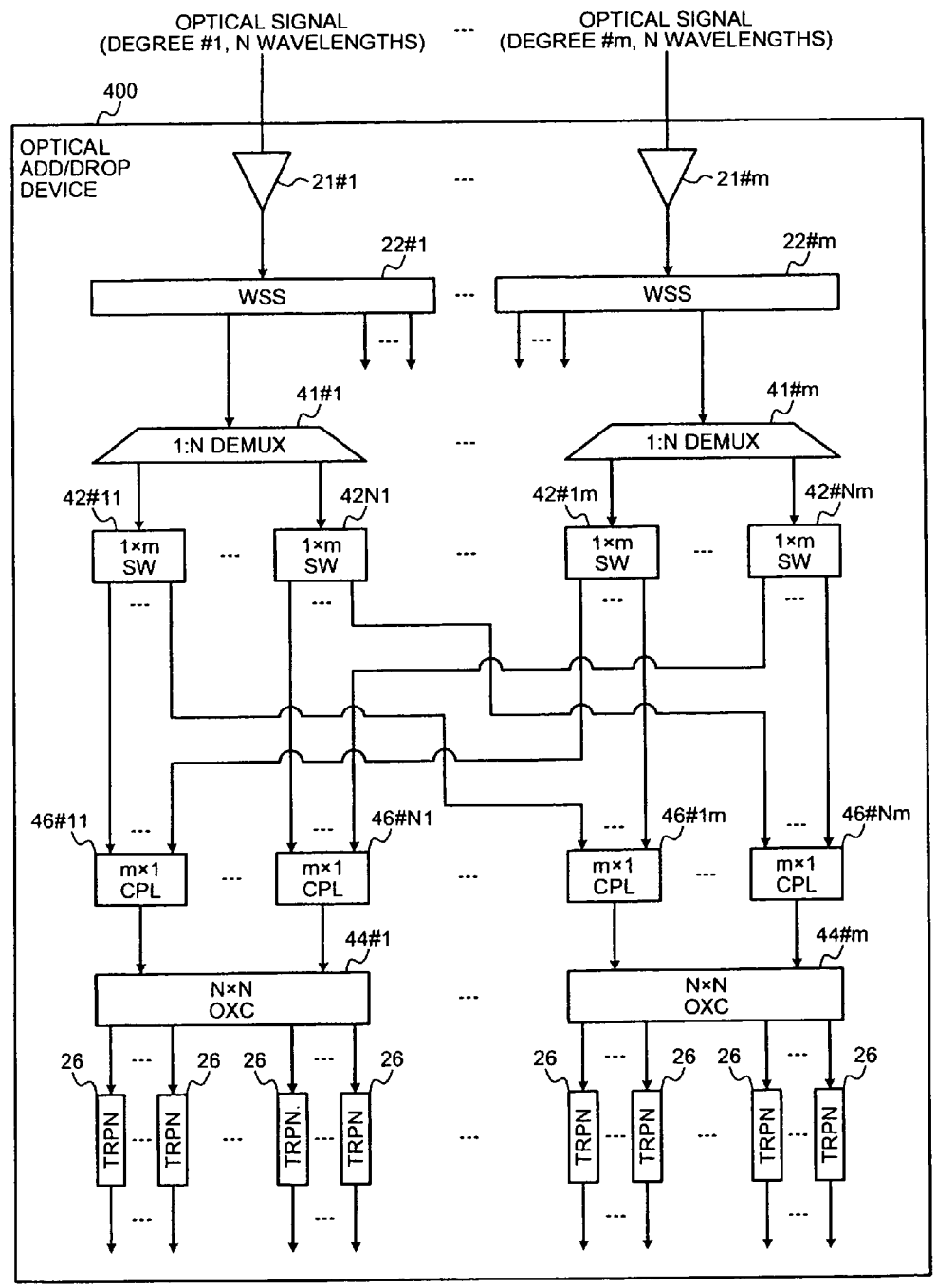
FIG. 15 is a diagram of a second example of modification of the optical add/drop device depicted in FIG. 11.

FIG. 15 is a diagram of a second example of modification of the optical add/drop device depicted in FIG. 11. In FIG. 15 components identical to those depicted in FIG. 11 are given the same reference numerals used in FIG. 11 and description thereof is omitted. As depicted in FIG. 15, in the optical add/drop device 400 depicted in FIG. 11, m×N couplers 46#11-46#Nm (second couplers) may be provided in place of the switches 43#11-43#Nm. The switches 42#11-42#N1, . . . , 42#1m-42#Nm each output to any one of the couplers 46#11-46#N1, . . . , 46#1m-46#Nm, the optical signals output from the demultiplexers 41#1-41#m.

The couplers 46#11-46#N1, . . . , 46#1m-46#Nm output to the cross connects 44#1-44#m, the optical signals output from the switches that output the optical signals, among the switches 42#11-42#N1, . . . , 42#1m-42#Nm. The cross connects 44#1-44#m are respectively N×N switches that change the paths of the optical signals output from the couplers 46#11-46#N1, . . . , 46#1m-46#Nm.

According to the optical add/drop device 400 depicted in FIG. 15, like the optical add/drop device 400 depicted in FIG. 11, even if the demultiplexers 41#1-41#m, which are wavelength dependent, are used, CDC function can be realized.

Figure 16:
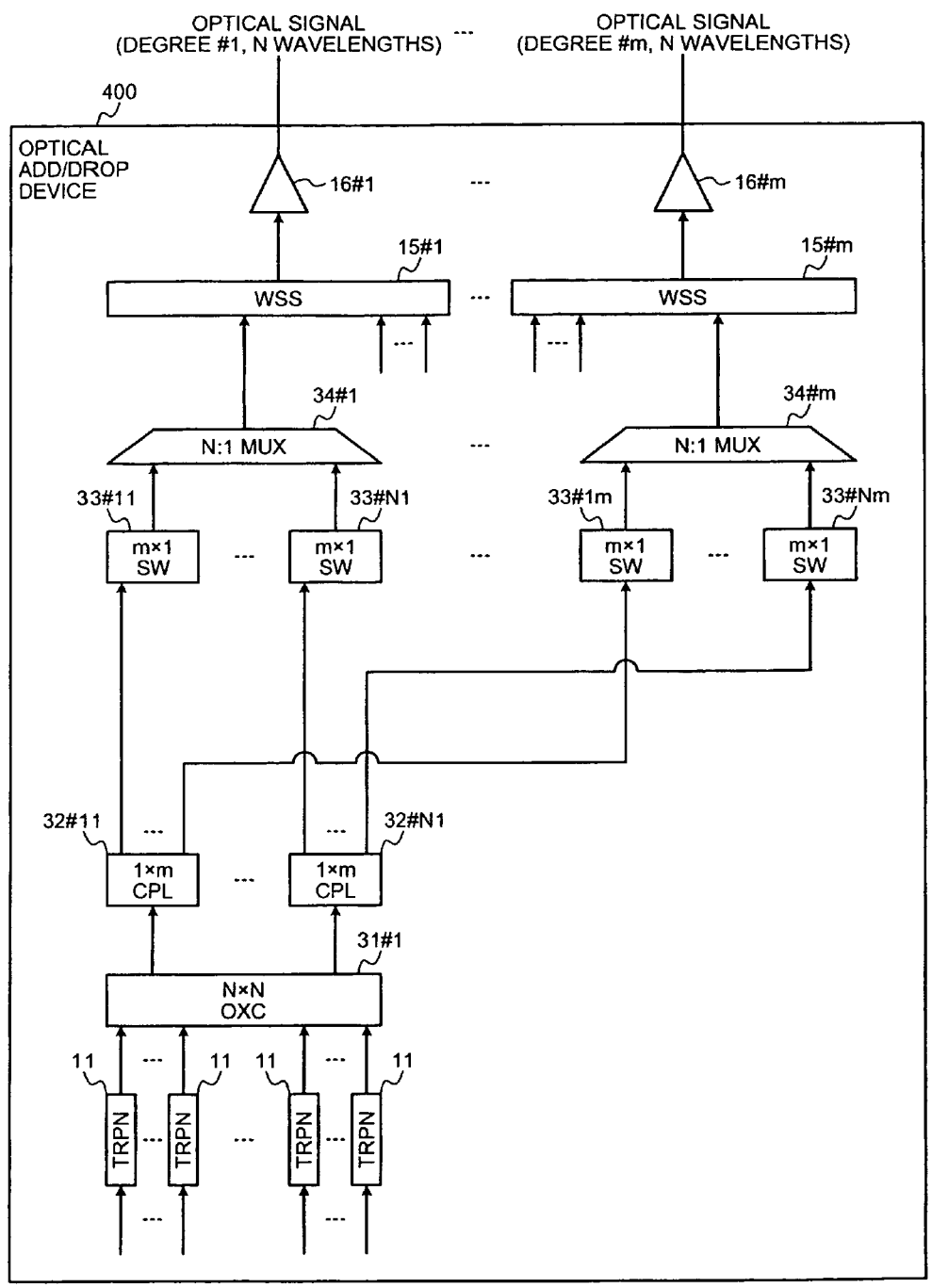
FIG. 16 is a diagram of an example of an initial operation state of the optical add/drop device depicted in FIG. 10.

FIG. 16 is a diagram of an example of an initial operation state of the optical add/drop device depicted in FIG. 10. In FIG. 16, components identical to those depicted in FIG. 10 are given the same reference numerals used in FIG. 10 and description thereof is omitted. The optical add/drop device 400 depicted in FIG. 16 has the configuration of the optical add/drop device 400 depicted in FIG. 10, where the client-side channel count is assumed to be 96.

For example, the optical add/drop device 400 includes 96 transponders 11, 1 cross connect 31#1, N switches 32#11-32#N1, m×N switches 33#11-33#Nm, m multiplexers 34#1-34#m, m wavelength selective switches 15#1-15#m, and m amplifiers 16#1-16#m. In this case, 12.5% add is possible with respect to the channels on the network-side.

In this case, the switches 32#11-32#N1, for example, can be 1×4 switches. Further, the switches 33#11-33#Nm, for example can be 4×1 switches. However, for future expansion, here, the switches 32#11-32#N1 are assumed as 1×m (e.g., 1×8) switches and the switches 33#11-33#Nm are assumed as m×1 (e.g., 8×1) switches, enabling increases in the client-side channel count, increases in the number of degrees, etc., while in service.

Figure 17:
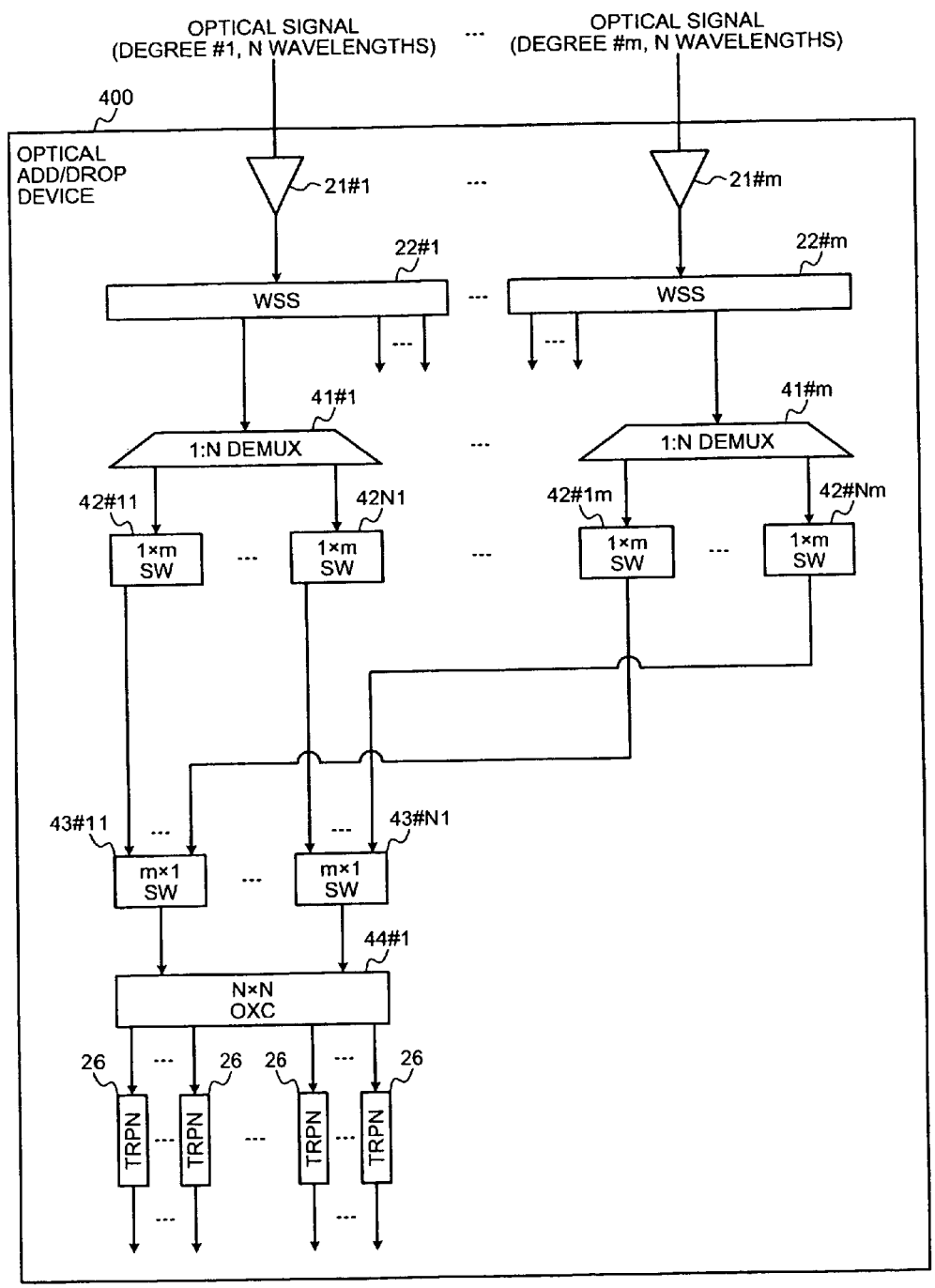
FIG. 17 is a diagram of an initial operation state of the optical add/drop device depicted in FIG. 11.

FIG. 17 is a diagram of an initial operation state of the optical add/drop device depicted in FIG. 11. In FIG. 17, components identical to those depicted in FIG. 11 are given the same reference numerals used in FIG. 11 and description thereof is omitted. The optical add/drop device 400 depicted in FIG. 17 has the configuration of the optical add/drop device 400 depicted in FIG. 11, where the client-side channel count is assumed to be 96.

For example, the optical add/drop device 400 includes m amplifiers 21#1-21#m, m wavelength selective switches 22#1-22#m, m demultiplexers 41#1-41#m, m×N switches 42#11-42#Nm, N switches 43#11-43#N1, 1 cross connect 44#1, and 96 transponders 26. In this case, 12.5% drop is possible with respect to the network-side channels.

In this case, the switches 42#11-42#N1 can be 1×4 switches. Further, the switches 43#11-43#N1 can be, for example, 4×1 switches. However, for future expansion, here, the switches 42#11-42#Nm are assumed as 1×m (e.g., 1×8) switches and the switches 43#11-43#N1 are assumed as m×1

(e.g., 8×1) switches, enabling increases in the client-side channel count, increases in the number of degrees, etc., while in service.

Figure 18:
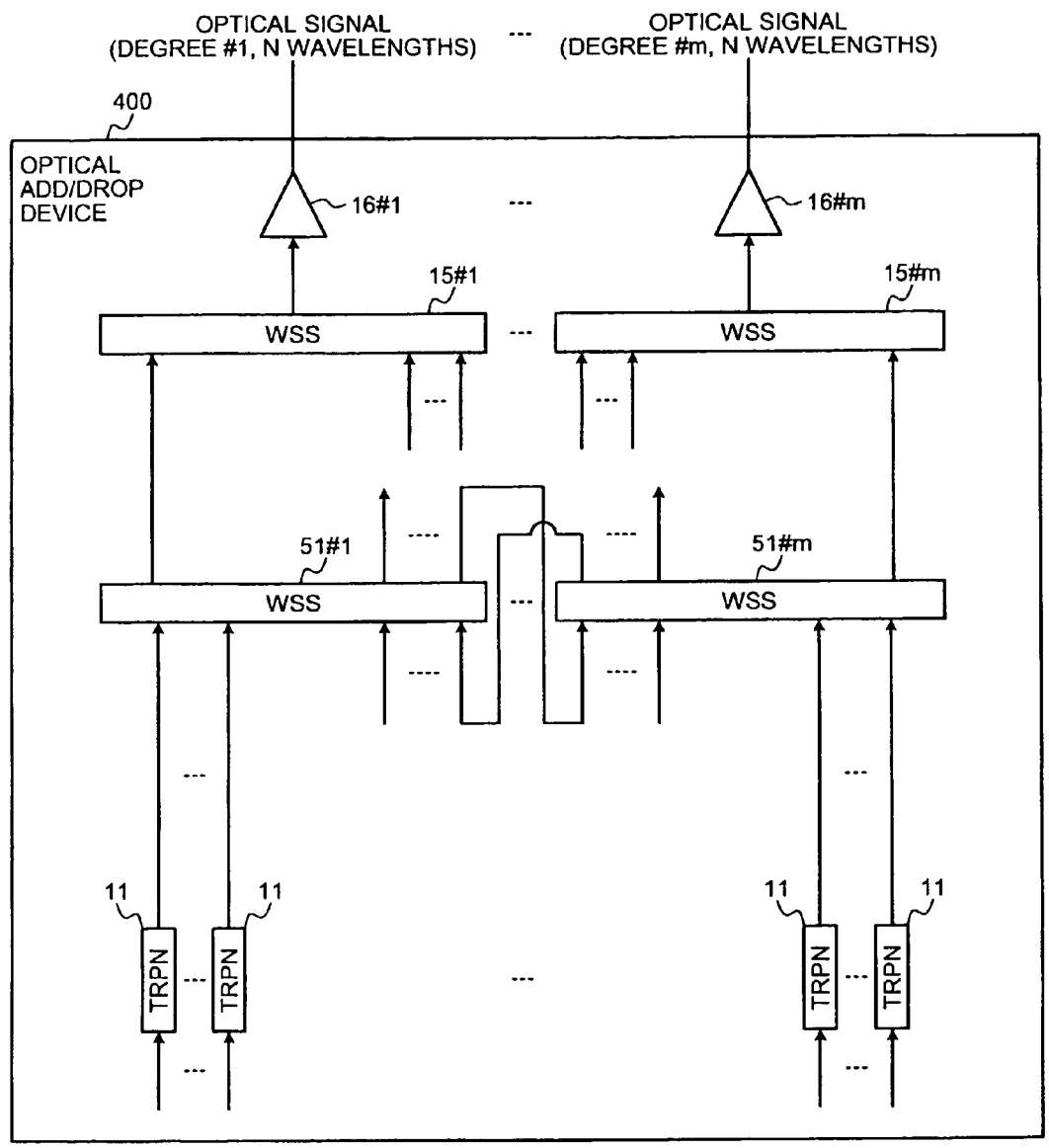
FIG. 18 is a diagram of a third example of the optical add/drop device to which the optical switching device depicted in FIGS. 1A, 1B is applied.

FIG. 18 is a diagram of a third example of the optical add/drop device to which the optical switching device depicted in FIGS. 1A, 1B is applied. In FIG. 18, components identical to those depicted in FIG. 4 are given the same reference numerals used in FIG. 4 and description thereof is omitted. The optical add/drop device 400 depicted in FIG. 18 has a configuration in which the client-side channel count is assumed as 64.

The optical add/drop device 400 depicted in FIG. 18 includes multiple transponders 11, m wavelength selective switches 51#1-51#m (second wavelength selective switches), m wavelength selective switches 15#1-15#m, and m amplifiers 16#1-16#m. The optical switching device 100 depicted in FIG. 1A or in FIG. 1B, for example, can be applied to the wavelength selective switches 15#1-15#m. The transponders 11 (transmitters) output optical signals to the wavelength selective switches 51#1-51#m, respectively.

The wavelength selective switches 51#1-51#m are provided respectively for the degrees #1-#m. Optical signals output from the transponders 11 and among the wavelength selective switches 51#1-51#m, optical signals from wavelength selective switches opposing other degrees are input to the wavelength selective switches 51#1-51#m. For example, the optical signals output from the transponders 11 and the optical signals from the wavelength selective switches 51#2-51#m are input to the wavelength selective switch 51#1.

The wavelength selective switches 51#1-51#m respectively switch the paths of the optical signals, according to wavelength and output the optical signals to the wavelength selective switches 15#1-15#m and the wavelength selective switches of other degrees, among the wavelength selective switches 51#1-51#m. For example, the wavelength selective switch 51#1 outputs to the wavelength selective switch 15#1 and the wavelength selective switches 51#2-51#m, the optical signal whose path has been switched. The wavelength selective switches 51#1-51#m are respectively 16×8 wavelength selective switches.

The optical signal (add) from the wavelength selective switch 51#1 and m−1 optical signals (through) from the other degrees (#2-#m) are input to wavelength selective switch 15#1. Similarly, the optical signals (add) from the wavelength selective switches 51#2-51#m and the m−1 optical signals (through) from the other degrees are input to the wavelength selective switches 15#2-15#m, respectively. The wavelength selective switches 15#1-15#m are respectively, for example, 8×1 wavelength selective switches.

In this manner, the wavelength selective switches 51#1-51#m that have multiple input ports and output ports are provided and the output ports and the input ports of the wavelength selective switches 51#1-51#m are optically coupled to one another. For example, the input ports of each of the wavelength selective switches 51#1-51#m include a port for adding the node of the wavelength selective switch and ports optically coupled to the other degrees, whereby the distribution and merging of signals to other degrees become possible (directionless).

Further, the wavelengths of the optical signals from the client-side can be arbitrarily selected by the wavelength selective switches 51#1-51#m (colorless). By distributing a given wavelength to an arbitrary degree by the wavelength selective switches 51#1-51#m, signals of the same wavelength can be prevented from colliding at a degree on the network-side (contentionless).

According to the optical add/drop device 400 depicted in FIG. 18, the initial cost can be reduced. Further, since the number of devices from the client-side to the network-side are fewer, optical loss can be reduced. Moreover, since the optical signals do not pass a device having a passband restriction, gridless schemes, which vary the passband of the wavelength selective switch according to the transmission route of the optical signal, can also be supported.

In the optical add/drop device 400 depicted in FIG. 18, the wavelength selective switches 51#1-51#m and the wavelength selective switches 15#1-15#m may be collectively provided as m wavelength selective switches. For example, the wavelength selective switch 51#1 and the wavelength selective switch 15#1 may be collectively provided as a 24×8 wavelength selective switch.

Figure 19:
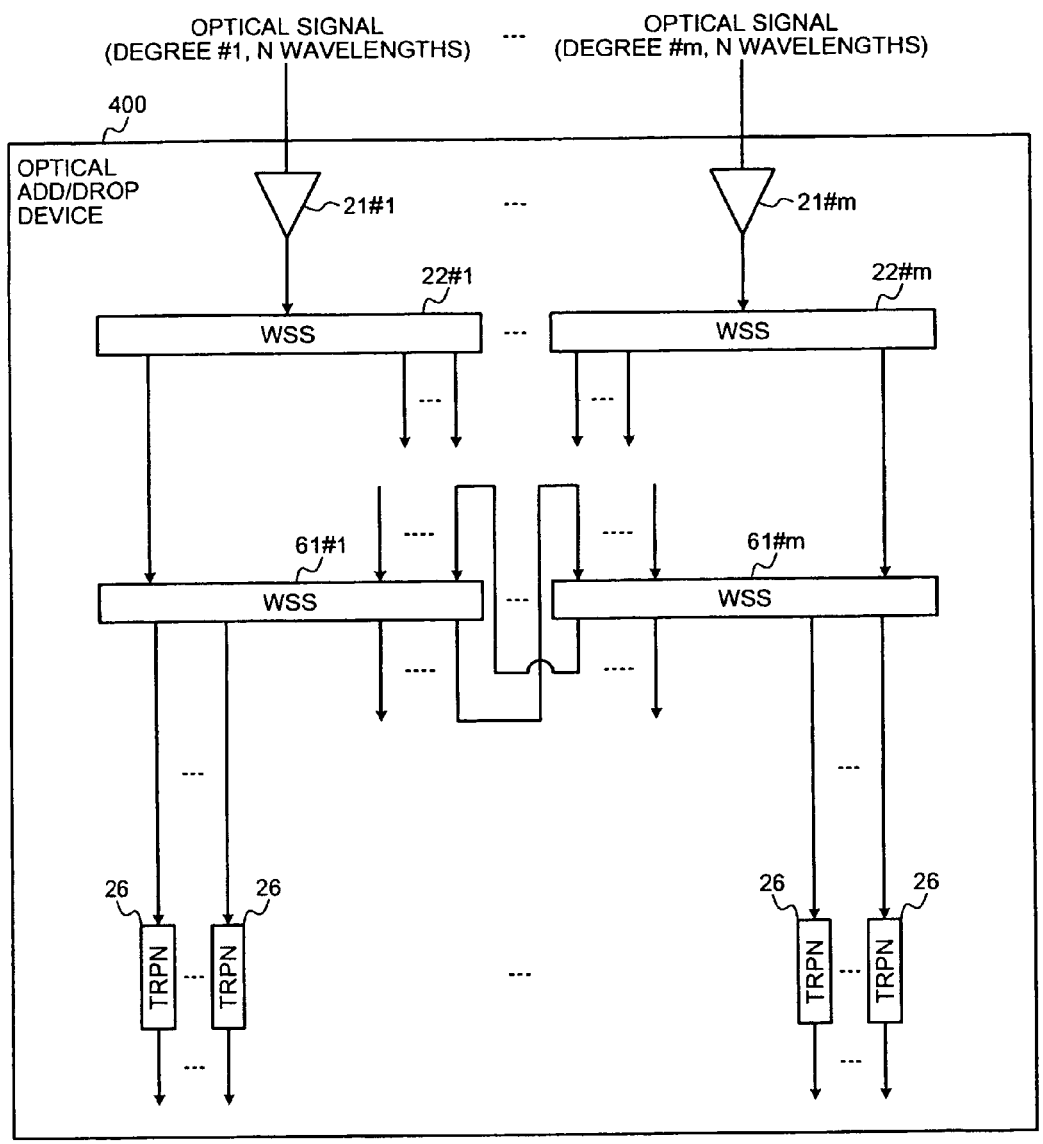
FIG. 19 is a diagram of a third example of optical add/drop device to which the optical switching device depicted in FIG. 2 is applied.

FIG. 19 is a diagram of a third example of optical add/drop device to which the optical switching device depicted in FIG. 2 is applied. In FIG. 19, components identical to those depicted in FIG. 5 are given the same reference numerals used in FIG. 5 and description thereof is omitted. The optical add/drop device 400 depicted in FIG. 19 has a configuration in which the client-side channel count is assumed as 64.

The optical add/drop device 400 depicted in FIG. 19 includes m amplifiers 21#1-21#m, m wavelength selective switches 22#1-22#m, m wavelength selective switches 61#1-61#m (second wavelength selective switches), and multiple transponders 26. The optical switching device 100 depicted in FIG. 2, for example, can be applied to the wavelength selective switches 22#1-22#m, respectively.

The wavelength selective switch 22#1 outputs an optical signal (add) to the wavelength selective switch 61#1 and m−1 optical signals (through) to the other degrees (#2-#m). Similarly, the wavelength selective switches 22#2-22#m respectively output optical signals (add) to the wavelength selective switches 61#2-61#m and m−1 optical signals (through) to the other degrees. The wavelength selective switches 22#1-22#m are respectively, for example, 1×8 wavelength selective switches.

The wavelength selective switches 61#1-61#m are respectively provided for the degrees #1-#m. Optical signals from the wavelength selective switches 22#1-22#m and among the wavelength selective switches 61#1-61#m, optical signals from the wavelength selective switches of other degrees are respectively input to the wavelength selective switches 61#1-61#m. For example, optical signals from the wavelength selective switch 22#1 and optical signals from the wavelength selective switches 61#2-61#m are input to the wavelength selective switch 61#1.

The wavelength selective switches 61#1-61#m output optical signals to the transponders 26 and optical signals to wavelength selective switches of other degrees. For example, the wavelength selective switch 61#1 outputs optical signals to the transponders 26 (receivers) and optical signals to the wavelength selective switches 61#2-61#m. The wavelength selective switches 61#1-61#m are respectively, for example, 8×16 wavelength selective switches.

In this manner, the wavelength selective switches 61#1-61#m having multiple input ports and output ports are provided and the output ports and the input ports of the wavelength selective switches 61#1-61#m are optically coupled to one another. For example, the input ports of each of the wavelength selective switches 61#1-61#m include a port for dropping the node of the wavelength selective switch and ports optically coupled to the other degrees, whereby the distribution and merging of signals from other degrees become possible (directionless).

According to the optical add/drop device 400 depicted in FIG. 19, configuration is simplified, enabling initial costs to be reduced. Further, since the number of devices from the network-side to the client-side are fewer, optical loss can be reduced. Moreover, since the optical signals do not pass a device having a passband restriction, gridless schemes, which vary the passband of the wavelength selective switch according to the transmission route of the optical signal, can also be supported.

In the optical add/drop device 400 depicted in FIG. 19, the wavelength selective switches 61#1-61#m and the wavelength selective switches 22#1-22#m may be collective provided as m wavelength selective switches. For example, the wavelength selective switch 61#1 and the wavelength selective switch 22#1 may be collective provided as an 8×24 wavelength selective switch.

Figure 20:
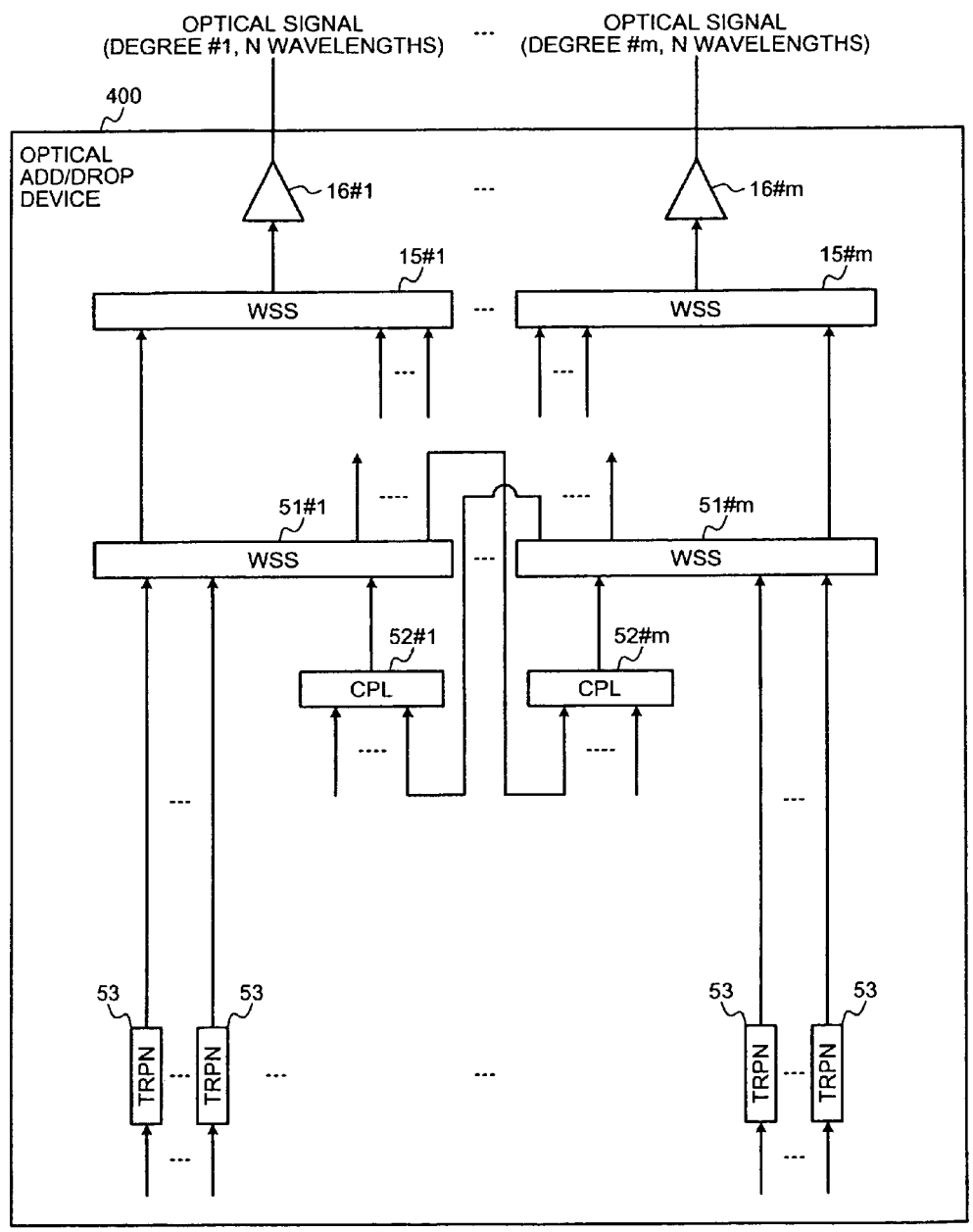
FIG. 20 is a diagram of a first example of modification of the optical add/drop device depicted in FIG. 18.

FIG. 20 is a diagram of a first example of modification of the optical add/drop device depicted in FIG. 18. In FIG. 20, components identical to those depicted in FIG. 18 are given the same reference numerals used in FIG. 18 and description thereof is omitted. The optical add/drop device 400 depicted in FIG. 20 has a configuration in which the client-side channel count is assumed as 120. The optical add/drop device 400 depicted in FIG. 20 includes couplers 52#1-52#m in addition to the configuration depicted in FIG. 18.

The couplers 52#1-52#m respectively couple optical signals from wavelength selective switches opposing other degrees, for input to the wavelength selective switches 51#1-514m. For example, the coupler 52#1 couples the optical signals from the wavelength selective switches 51#2-51#m, for input to the wavelength selective switch 51#1. The couplers 52#1-52#m output the coupled optical signals to the wavelength selective switches 51#1-51#m, respectively.

Consequently, in the input ports of the wavelength selective switches 51#1-51#m, for example, m−1−1 availability is further obtained, whereby, for example, the client-side channel count can be further increased.

Figure 21:
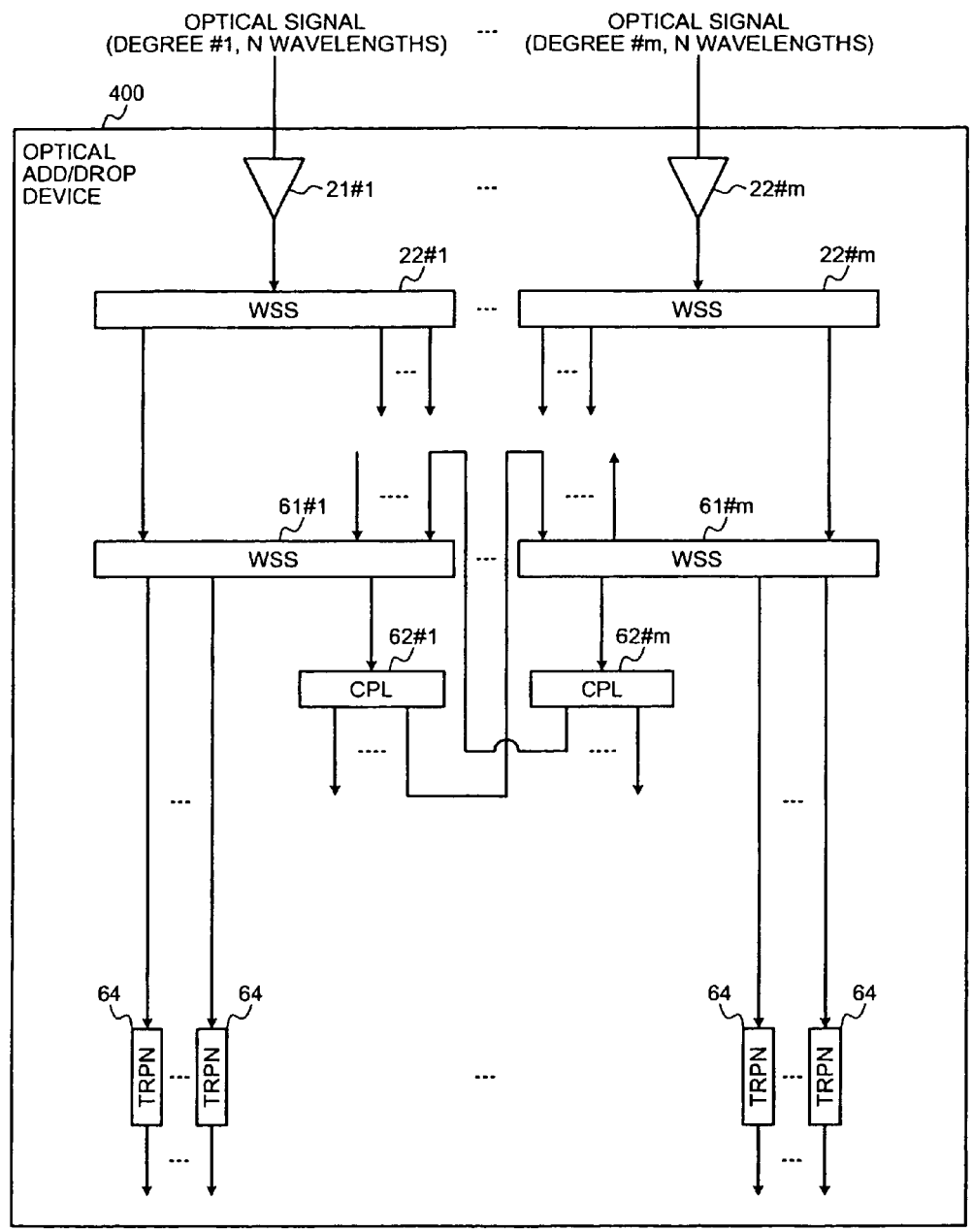
FIG. 21 is a diagram of a first example of modification of the optical add/drop device depicted in FIG. 19.

FIG. 21 is a diagram of a first example of modification of the optical add/drop device depicted in FIG. 19. In FIG. 21, components identical to those depicted in FIG. 19 are given the same reference numerals used in FIG. 19 and description thereof is omitted. The optical add/drop device 400 depicted in FIG. 21 has a configuration in which the client-side channel count is assumed as 120. The optical add/drop device 400 depicted in FIG. 21 includes couplers 62#1-62#m in addition to the configuration depicted in FIG. 19.

The wavelength selective switches 61#1-61#m collect the optical signals to the wavelength selective switches of other degrees and output the optical signals to the couplers 62#1-62#m. For example, the wavelength selective switch 61#1 collects the optical signals to the wavelength selective switches 61#2-61#m of the other degrees and outputs the optical signals to the coupler 62#1.

The couplers 62#1-62#m are respectively splitters that split the optical signals that are output from the wavelength selective switches 61#1-61#m to the wavelength selective switches of other degrees. For example, the coupler 62#1 splits the optical signal that is output from the wavelength selective switch 61#1 to the wavelength selective switches 61#2-61#m. The couplers 62#1-62#m respectively output the split optical signals to the wavelength selective switches 61#1-61#m. For example the coupler 62#1 outputs the split optical signals to the wavelength selective switches 61#2-61#m.

Consequently, in the output ports of the wavelength selective switches 61#1-61#m, for example, m−1−1 availability is further obtained, whereby, for example, the client-side channel count can be further increased.

Figure 22:
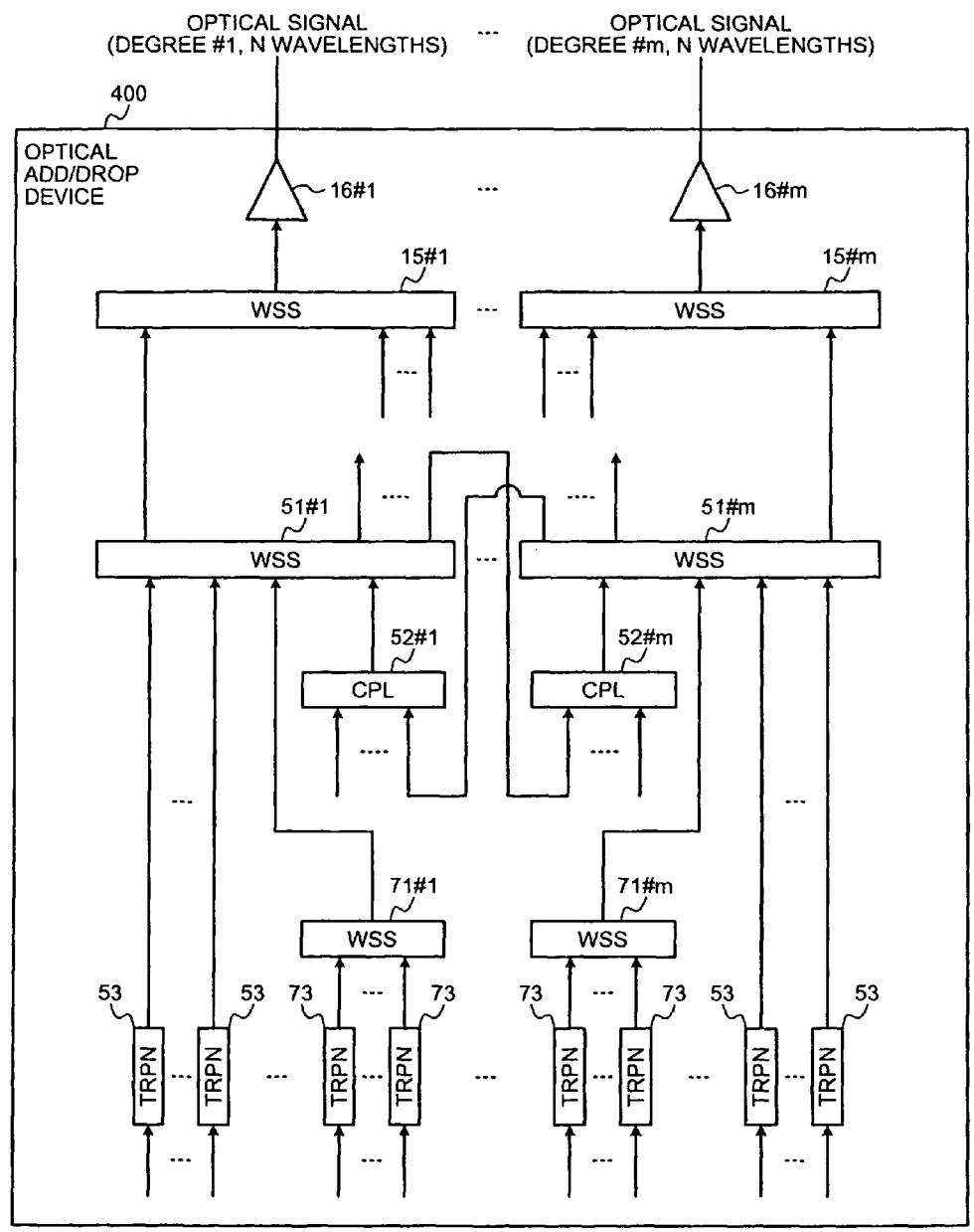
FIG. 22 is a diagram of a second example of modification of the optical add/drop device depicted in FIG. 18.

FIG. 22 is a diagram of a second example of modification of the optical add/drop device depicted in FIG. 18. In FIG. 22, components identical to those depicted in FIG. 20 are given the same reference numerals used in FIG. 20 and description thereof is omitted. The optical add/drop device 400 depicted in FIG. 22 includes wavelength selective switches 71#1-71#m (third wavelength selective switches) in addition to the configuration depicted in FIG. 20. The optical switching device 100 depicted in FIG. 1A or in FIG. 1B can be applied to the wavelength selective switches 71#1-71#m, respectively.

The output ports of the wavelength selective switches 1#1-71#m are respectively optically coupled to one of the input ports of the wavelength selective switches 51#1-51#m. Further, the wavelength selective switches 71#1-71#m respectively have multiple input ports (e.g., 16). Consequently, the client-side channel count can be further increased with respect to the input ports of the wavelength selective switches 71#1-71#m and by increasing the number of wavelength selective switches 71#1-71#m, the client-side channel count can be further increased.

Figure 23:
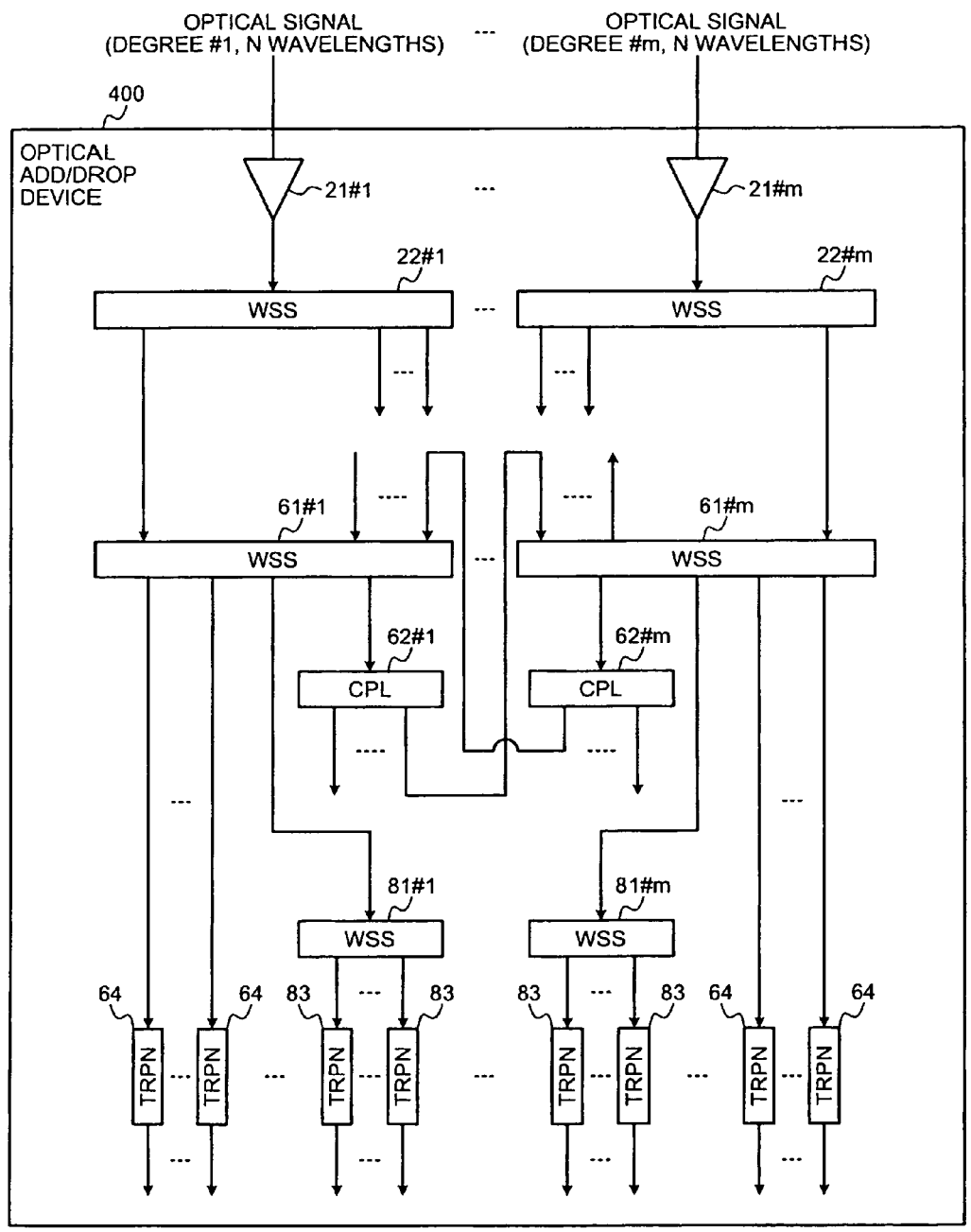
FIG. 23 is a diagram of a second example of modification of the optical add/drop device depicted in FIG. 19.

FIG. 23 is a diagram of a second example of modification of the optical add/drop device depicted in FIG. 19. In FIG. 23, components identical to those depicted in FIG. 21 are given the same reference numerals used in FIG. 21 and description thereof is omitted. The optical add/drop device 400 depicted in FIG. 23 includes wavelength selective switches 81#1-81#m (third wavelength selective switches) in addition to the configuration depicted in FIG. 21. The optical switching device 200 depicted in FIG. 2 can be applied to the wavelength selective switches 81#1-81#m, respectively.

The input ports of the wavelength selective switches 81#1-81#m are respectively optically coupled to one output port of the wavelength selective switches 61#1-61#m. Further, the wavelength selective switches 81#1-81#m respectively have multiple output ports (e.g., 16). Consequently, the client-side channel count can be further increase with respect to the input ports of the wavelength selective switches 81#1-81#m and by increasing the number of wavelength selective switches 81#1-81#m, the client-side channel count can be further increased.

Figure 24:
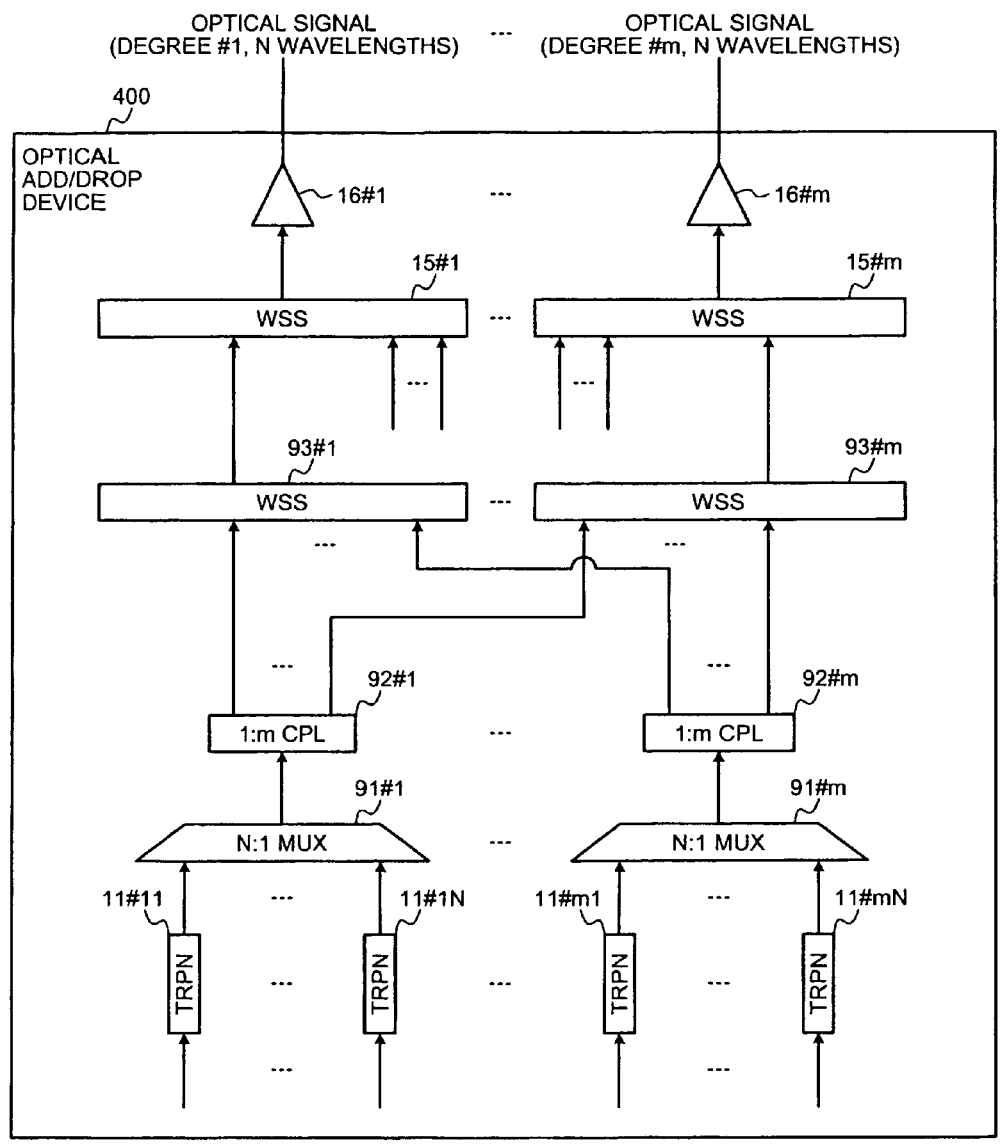
FIG. 24 is a diagram of a fourth example of the optical add/drop device to which the optical switching device depicted in FIGS. 1A, 1B has been applied.

FIG. 24 is a diagram of a fourth example of the optical add/drop device to which the optical switching device depicted in FIGS. 1A, 1B has been applied. In FIG. 24, components identical to those depicted in FIG. 4 are given the same reference numerals used in FIG. 4 and description thereof is omitted.

The optical add/drop device 400 depicted in FIG. 24 includes m×N transponders 11#11-11#mN, m multiplexers 91#1-91#m, m couplers 92#1-92#m, m wavelength selective switches 93#1-93#m, m wavelength selective switches 15#1-15#m, and m amplifiers 16#1-16#m. The optical switching device 100 depicted in FIG. 1A or FIG. 1B, for example, can be applied to the wavelength selective switches 15#1-15#m, respectively. Further, the optical switching device 100 depicted in FIG. 1A or FIG. 1B may be applied to the wavelength selective switches 93#1-93#m, respectively.

The transponders 11#11-11 mN respectively output optical signals to the multiplexers 91#1-91#m. For example, the transponders 11#11-11#1N respectively output an extracted optical signal to the multiplexer 91#1. The multiplexers 91#1-91#m respectively multiplex (wavelength division multiplex) the optical signals output from the transponders 11#11-11#mN and output the multiplexed signals to the couplers 92#1-92#m.

The couplers 92#1-92#m are respectively 1:m couplers (splitters) that split into m optical signals, the optical signals output from the multiplexers 91#1-91#m. The couplers 92#1-92#m output the m optical signals to the wavelength selective switches 93#1-93#m, respectively. For example, the coupler 92#1 outputs the m optical signals to the wavelength selective switches 93#1-93#m, whereby optical signals from the client-side are distributed to the add/drop paths of the degrees.

The wavelength selective switches 93#1-93#m are respectively m:1 wavelength selective switches that respectively select according to wavelength, an optical signal output from the couplers 92#1-92#m and output the selected optical signal to the wavelength selective switches 15#1-15#m. For example, the wavelength selective switch 93#1 selects, according to wavelength, an optical signal output from the couplers 92#1-92#m and outputs the selected optical signal to the wavelength selective switch 15#1.

In this manner, degree dependency can be eliminated (directionless) by optically coupling the multiplexers 91#1-91#m, the couplers 92#1-92#m, the wavelength selective switches 93#1-93#m, 15#1-15#m to one another. Further, the number of degrees can be easily increased by increasing the number of multiplexers 91#1-91#m, couplers 92#1-92#m, and wavelength selective switches 93#1-93#m, 15#1-15#m.

In the configuration depicted in FIG. 24, the wavelength selective switches 93#1-93#m, 15#1-15#m may be implemented by m wavelength selective switches. For example, the wavelength selective switch 93#1 and the wavelength selective switch 15#1 may be implemented by one wavelength selective switch. In this case, although there is a large number of input ports of the wavelength selective switches, the number of input ports can be easily secured by applying the optical switching device 100 depicted in FIG. 1A or FIG. 1B.

Figure 25:
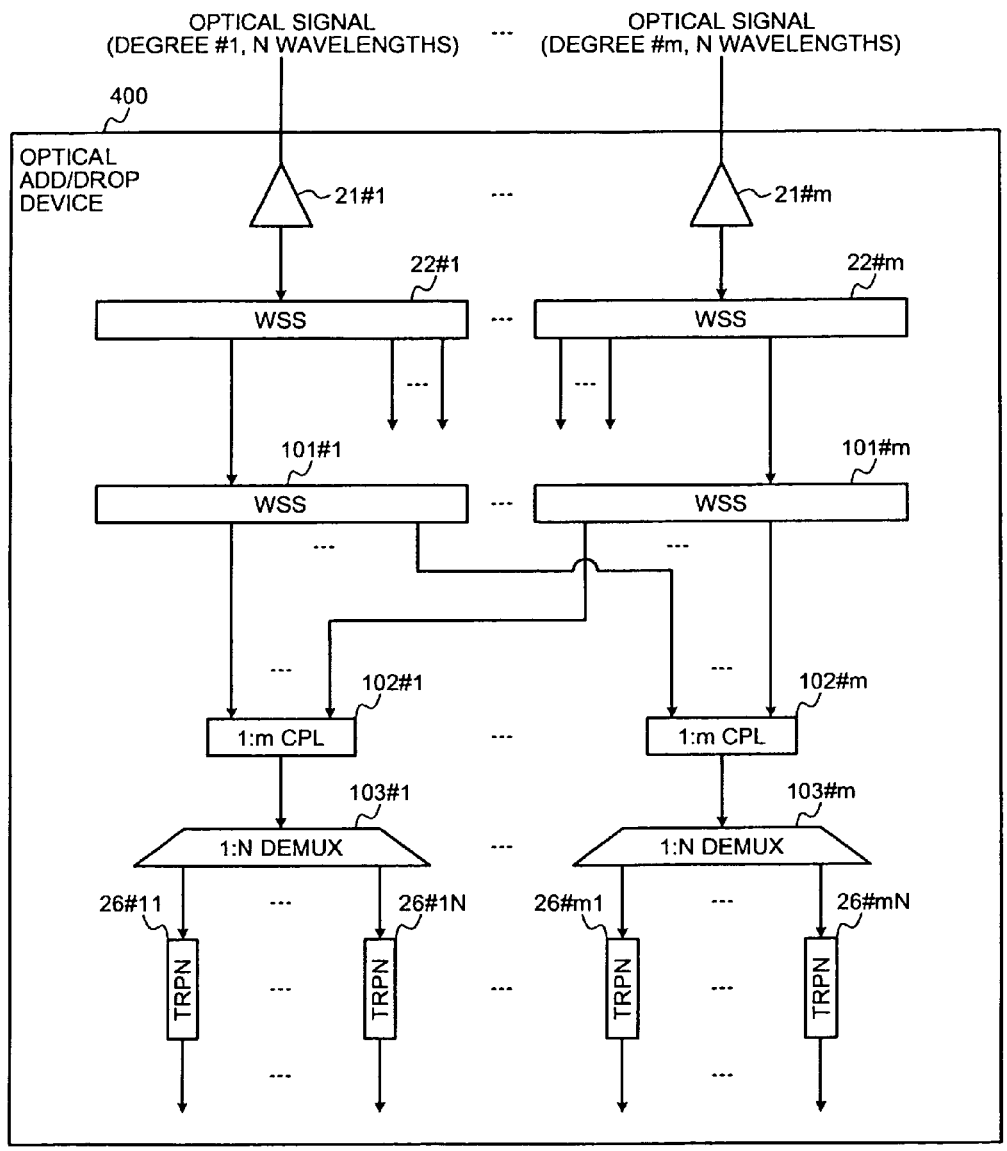
FIG. 25 is a diagram of a fourth example of the optical add/drop device to which the optical switching device depicted in FIG. 2 is applied.

FIG. 25 is a diagram of a fourth example of the optical add/drop device to which the optical switching device depicted in FIG. 2 is applied. In FIG. 25, components identical to those depicted in FIG. 5 are given the same reference numerals used in FIG. 5 and description thereof is omitted. The optical add/drop device 400 depicted in FIG. 25 has a configuration in which the client-side channel count is assumed as 768.

The optical add/drop device 400 depicted in FIG. 25 includes m amplifiers 21#1-21#m, m wavelength selective switches 22#1-22#m, m wavelength selective switches 101#1-101#m, m couplers 102#1-102#m, m demultiplexers 103#1-103#m, and m×N transponders 26#11-26#mN. The optical switching device 200 depicted in FIG. 2, for example, can be applied to the wavelength selective switches 22#1-22#m, respectively. Further, the optical switching device 200 depicted in FIG. 2 may be applied to the wavelength selective switches 101#1-101#m, respectively.

The wavelength selective switches 101#1-101#m are respectively 1:8 wavelength selective switches that switch, according to wavelength, the paths of the optical signals that are from the wavelength selective switches 22#1-22#m and output the optical signals to the couplers 102#1-102#m. For example, the wavelength selective switch 101#1 switches, according to wavelength, the path of the optical signal that is from the wavelength selective switch 22#1 and outputs the optical signal to the couplers 102#1-102#m.

The couplers 102#1-102#m respectively couple the optical signals output from the wavelength selective switches 101#1-101#m and output the coupled signals to the demultiplexers 103#1-103#m. For example the coupler 102#1 couples the optical signals output from the wavelength selective switches 101#1-101#m and outputs the coupled optical signal to the demultiplexer 103#1, whereby optical signals from the degrees are coupled.

The demultiplexers 103#1-103#m respectively demultiplex (wavelength division demultiplex) the optical signals output from the couplers 102#1-102#m and output the resulting optical signals to the transponders 26#11-26#mN. For example, the demultiplexer 103#1 outputs the demultiplexed optical signals to the transponders 26#11-26#1N.

In this manner, degree dependency can be eliminated (directionless) by optically coupling the demultiplexers 103#1-103#m, the couplers 102#1-102#m, the wavelength selective switches 101#1-101#m, 22#1-22#m to one another. Further, the number of degrees can be easily increased by increasing the number of demultiplexers 103#1-103#m, couplers 102#1-102#m, and wavelength selective switches 101#1-101#m, 22#1-22#m.

In the configuration depicted in FIG. 25, the wavelength selective switches 101#1-101#m, 22#1-22#m may be implemented by m wavelength selective switches. For example, the wavelength selective switch 101#1 and the wavelength selective switch 22#1 are implemented by one wavelength selective switch. In this case, although there are a large number of output ports of the wavelength selective switches, the number of output ports can be easily secured by applying the optical switching device 200 depicted in FIG. 2.

Figure 26:
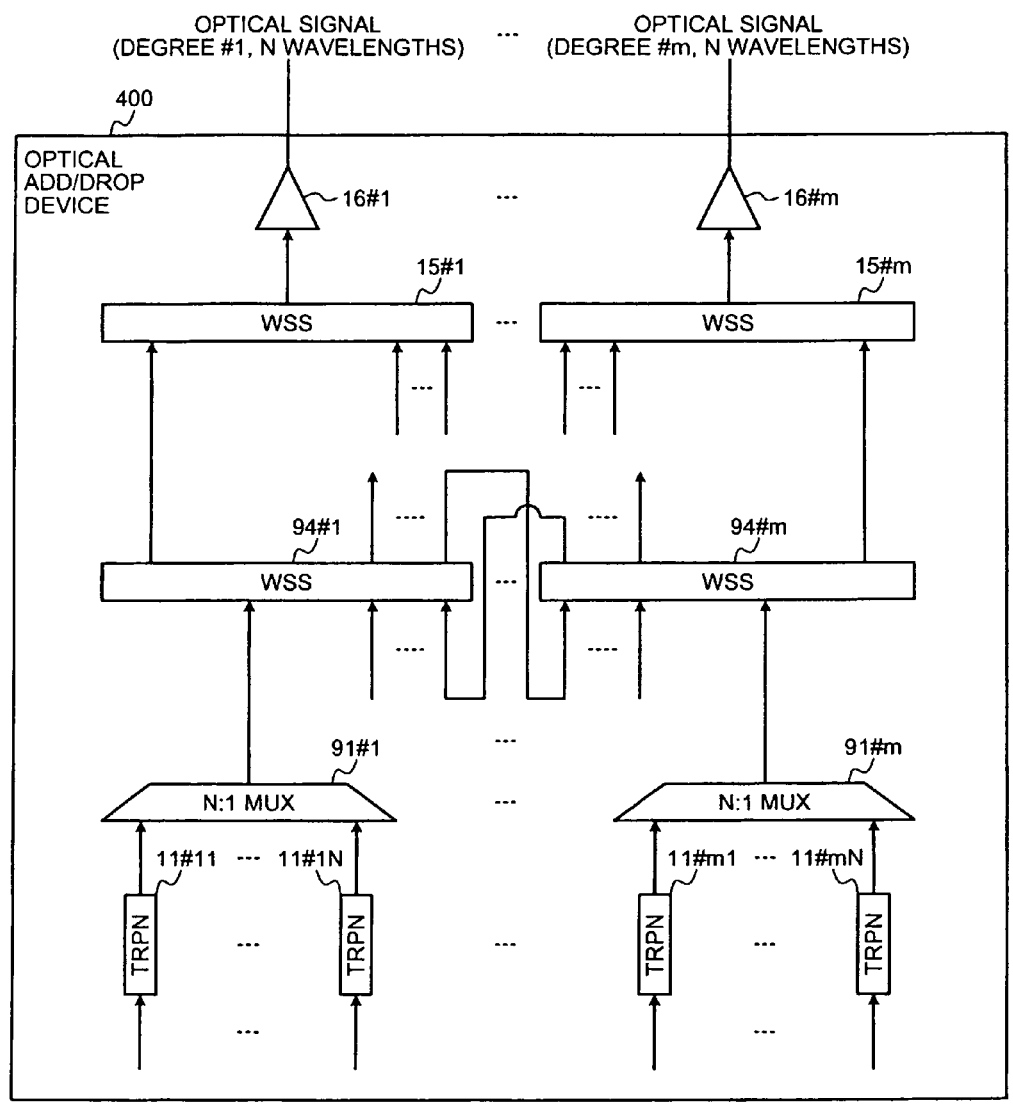
FIG. 26 is a diagram of a fifth example of the optical add/drop device to which the optical switching device depicted in FIGS. 1A, 1B is applied.

FIG. 26 is a diagram of a fifth example of the optical add/drop device to which the optical switching device depicted in FIGS. 1A, 1B is applied. In FIG. 26, components identical to those depicted in FIG. 24 are given the same reference numerals used in FIG. 24 and description thereof is omitted. The optical add/drop device 400 depicted in FIG. 26 has a configuration in which the client-side channel count is assumed as 768.

The optical add/drop device 400 depicted in FIG. 26 includes wavelength selective switches 94#1-94#m in place of the couplers 92#1-92#m and the wavelength selective switches 93#1-93#m depicted in FIG. 24. The optical switching device 100 depicted in FIG. 1A or FIG. 1B, for example, can be applied to the wavelength selective switches 15#1-15#m, respectively.

Optical signals output from the multiplexers 91#1-91#m and among the wavelength selective switches 94#1-94#m, optical signals from the wavelength selective switches of other degrees are input to the wavelength selective switches 94#1-94#m. For example, the optical signal from the multiplexer 91#1 and the optical signals from the wavelength selective switches 94#2-94#m are input to the wavelength selective switch 94#1.

The wavelength selective switches 94#1-94#m switch, according to wavelength, the paths of the optical signals and output the optical signals to the wavelength selective switches 15#1-15#m and to the wavelength selective switches of other degrees, among the wavelength selective switches 94#1-94#m. For example, the wavelength selective switch 94#1 outputs an optical signal to the wavelength selective switch 15#1 and to the wavelength selective switches 94#2-94#m. The wavelength selective switches 94#1-94#m, respectively, for example, are 8×8 wavelength selective switches.

The optical signal (add) from the wavelength selective switch 94#1 and the m−1 optical signals (through) from the other degrees (#2-#m) are input to the wavelength selective switch 15#1. Similarly, the optical signals (add) from the wavelength selective switches 94#2-94#m and the m−1 optical signals (through) from the other degrees are input to the wavelength selective switches 15#2-15#m.

In this manner, the wavelength selective switches 94#1-94#m having multiple input ports and output ports are provided and the output ports and the input ports of the wavelength selective switches 94#1-94#m are optically coupled to one another. For example, the input ports of each of the wavelength selective switches 94#1-94#m include a port for adding the node of the wavelength selective switch and ports optically coupled to the other degrees, whereby the distribution and merging of signals to other degrees become possible (directionless). According to the configuration depicted in FIG. 26, optical loss in the add/drop paths and the number of components can be reduced.

Figure 27:
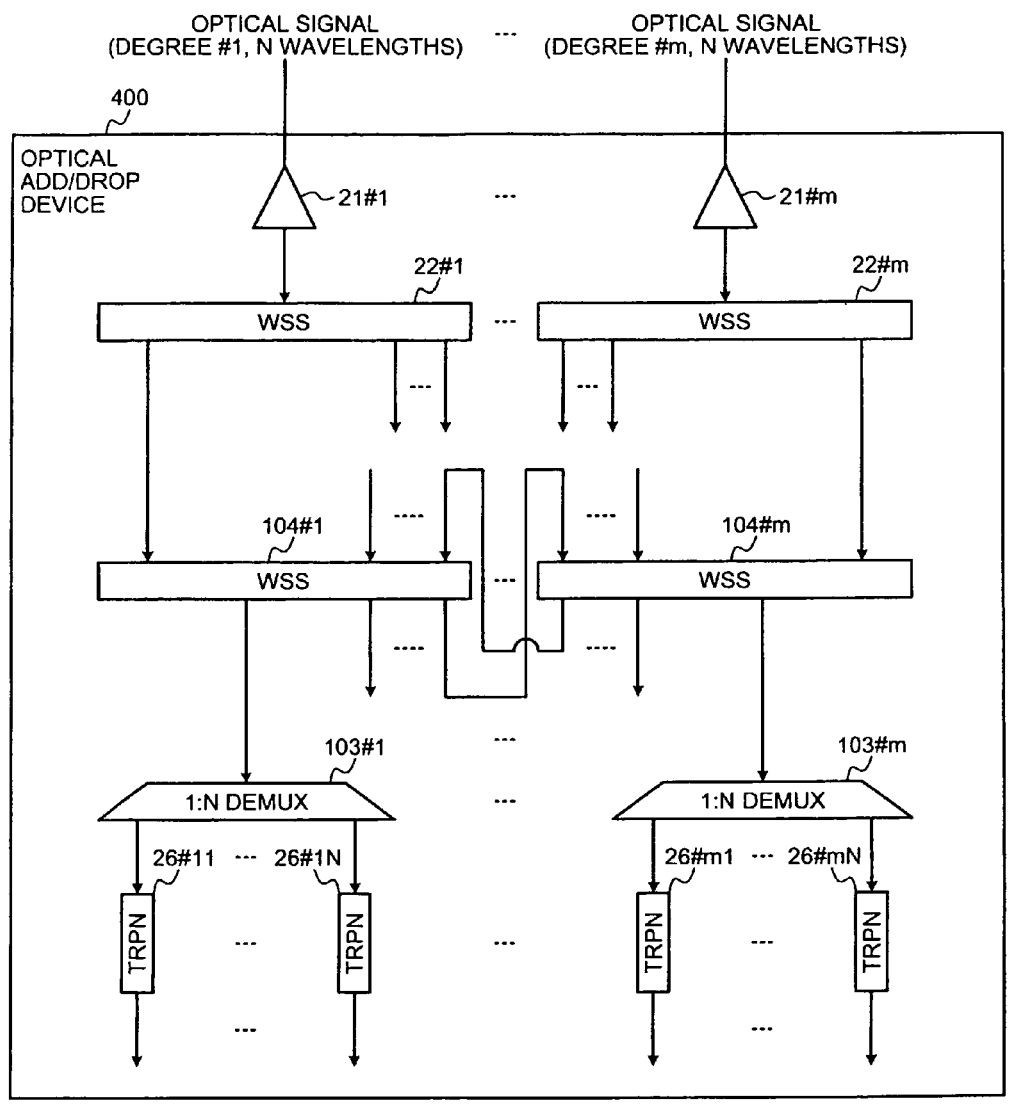
FIG. 27 is a diagram of a fifth example of the optical add/drop device to which the optical switching device depicted in FIG. 2 is applied.

FIG. 27 is a diagram of a fifth example of the optical add/drop device to which the optical switching device depicted in FIG. 2 is applied. In FIG. 27, components identical to those depicted in FIG. 25 are given the same reference numerals used in FIG. 25 and description thereof is omitted. The optical add/drop device 400 depicted in FIG. 27 includes wavelength selective switches 104#1-104#m in place of the wavelength selective switches 101#1-101#m and the couplers 102#1-102#m depicted in FIG. 25. The optical switching device 200 depicted in FIG. 2 can be applied, for example, to the wavelength selective switches 22#1-22#m, respectively.

The optical signals from the wavelength selective switches 22#1-22#m and among the wavelength selective switches 104#1-104#m, the optical signals from the wavelength selective switches of other degrees are input to the wavelength selective switches 104#1-104#m. For example, the optical signal from the wavelength selective switch 22#1 and the optical signals from the wavelength selective switches 104#2-104#m are input to the wavelength selective switch 104#1.

The wavelength selective switches 104#1-104#m output optical signals to the demultiplexers 103#1-103#m and among the wavelength selective switches 104#1-104#m, to the wavelength selective switches of other degrees. For example, the wavelength selective switch 104#1 outputs optical signals to the demultiplexer 103#1 and to the wavelength selective switches 104#2-104#m. The wavelength selective switches 104#1-104#m are respectively, for example, 8×8 wavelength selective switches. The demultiplexers 103#1-103#m demultiplex the optical signals output from the wavelength selective switches 104#1-104#m.

In this manner, the wavelength selective switches 104#1-104#m having multiple input ports and output ports are provided and the output ports and the input ports of the wavelength selective switches 104#1-104#m are optically coupled to one another. For example, the input ports of each of the wavelength selective switches 104#1-104#m include a port for dropping the node of the wavelength selective switch and ports optically coupled to the other degrees. Consequently, the distribution and merging of signals from other degrees become possible (directionless). According to the configuration depicted in FIG. 27, optical loss in add/drop paths and the number of components can be reduced.

As described, according to the optical switching device, the optical add device, and the optical drop device, the third ports of an optical coupler are optically coupled to the first ports of multiple wavelength selective switches, whereby a wavelength selective switch having a large number of ports can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical add device comprising:
   a plurality of optical switching devices including:
   a plurality of wavelength selective switches that respectively have a first port being an output port and a plurality of second ports being input ports,
   an optical coupler that has a plurality of third ports on an input-side, respectively optically coupled with the first ports of the wavelength selective switches to couple optical signals output from output ports of the wavelength selective switches,
   a wavelength monitor that monitors each wavelength included among optical signals,
   a detector that detects, based on monitor results obtained by the wavelength monitor, optical signals which include a same wavelength, and
   a controller that causes any one of the wavelength selective switches which output one of the detected optical signals to terminate output of the optical signal when an optical signal which includes the same wavelength is detected,
   the plurality of the optical switching devices, respectively transmitting to degrees of a network, an optical signal coupled by the optical coupler;
   a plurality of transmitters that respectively output an optical signal; and
   optical paths that input to the input ports of the optical switching devices, the optical signals output by the transmitters and including:
   a plurality of cross connects that each have a plurality of input ports to which the optical signals output by the transmitters are input, and a plurality of output ports,
   a plurality of first switches that each have an input port that is optically coupled to an output port of one of the cross connects, and a plurality of output ports,
   a plurality of second switches that each have input ports that are optically coupled to the output ports of the first switches, and an output port, and
   a plurality of multiplexers that multiplex optical signals output from the output ports of the second switches and input the multiplexed optical signals to the input ports of the optical switching devices.

2. The optical add device according to claim 1, wherein the optical paths include:
   a plurality of second couplers that each have input ports that are optically coupled to the output ports of the switches, and an output port, and
   the plurality of multiplexers multiplex the optical signals output from the output ports of the second couplers and input the multiplexed optical signals to the input ports of the optical switching devices.

3. The optical add device according to claim 1, wherein the optical paths include:
   a plurality of second couplers that each have an input port that is optically coupled to an output port of one of the cross connects, and a plurality of output ports, and
   a plurality of switches that each have input ports that are optically coupled to the output ports of the second couplers, and an output port.

4. The optical add device according to claim 1, wherein the optical paths include a plurality of second wavelength selective switches that have input ports and output ports that are respectively optically coupled, and that each have a plurality of input ports to which the optical signals output by the transmitters are input and output ports that are optically coupled to the input ports of the optical switching devices.

5. The optical add device according to claim 1, wherein the optical paths include:
   a plurality of multiplexers that multiplex the optical signals output by the transmitters,
   a plurality of second couplers that split the optical signals multiplexed by the multiplexers, and
   a plurality of second wavelength selective switches that each have a plurality of input ports to which the optical signals resulting from splitting by the second couplers are input, and an output port that is optically coupled to an input port of one of the optical switching devices.

6. The optical add device according to claim 1, wherein the optical paths include:
   a plurality of multiplexers that multiplex the optical signals output from the transmitters; and
   a plurality of second wavelength selective switches that have input ports and output ports that are respectively optically coupled, a plurality of input ports to which a multiplexed optical signal is input from one of the multiplexers, and output ports that are optically coupled the input ports of the optical switching devices.

7. An optical drop device comprising:
   a plurality of optical switching devices each including:
   a plurality of wavelength selective switches that respectively have a first port being an input port and a plurality of second ports being output ports,
   an optical coupler that has a plurality of third ports on an output-side, respectively optically coupled to the first ports of the wavelength selective switches, the optical coupler splits an optical signal into plural optical signals and outputs the optical signals to the input port of each wavelength selective switch, respectively,
   a wavelength monitor that monitors each wavelength included among optical signals,
   a detector that detects, based on monitor results obtained by the wavelength monitor, optical signals which include a same wavelength, and
   a controller that causes any one of the wavelength selective switches which output one of the detected optical signals to terminate output of the optical signal when an optical signal which includes the same wavelength is detected,
   the optical signals from degrees of a network are input to the optical couplers, respectively;
   a plurality of receivers that receive the optical signals, respectively; and
   a plurality of optical paths that output to the receivers, respectively, the optical signals output from the output ports of the wavelength selective switches, the plurality of optical paths including:
   a plurality of demultiplexers that demultiplex the optical signals output from the optical switching devices,
   a plurality of first switches that each have an input port to which an optical signal output from one of the demultiplexers is input and a plurality of output ports,
   a plurality of second switches that each include a plurality of input ports that are respectively optically coupled to the output ports of the first switches, and an output port, and
   a plurality of cross connects that each include a plurality of input ports that are optically coupled to the output ports of the second switches, and a plurality of output ports that output the optical signals to the receivers.

8. The optical drop device according to claim 7, wherein the optical paths include:
   a plurality of second couplers that each have an input port to which an optical signal output from one of the demultiplexers is input and a plurality of output ports, and
   a plurality of switches that each have a plurality of input ports that are respectively optically coupled to the output ports of the second couplers, and an output port.

9. The optical drop device according to claim 7, wherein the optical paths include:
   a plurality of switches that each have an input port to which an optical signal from one of the demultiplexers is input, and a plurality of output ports,
   a plurality of second couplers that each have a plurality of input ports that are respectively optically coupled to the output ports of the switches, and an output port, and
   a plurality of cross connects that each have a plurality of input ports that are respectively optically coupled to the output ports of the second couplers and a plurality of output ports that output the optical signals to the receivers.

10. The optical drop device according to claim 7, wherein the optical paths include a plurality of second wavelength selective switches that have input ports and output ports that are respectively optically coupled, an input port optically coupled to an output port of one of the optical switching devices and a plurality of output ports that output the optical signals to the receivers.

* * * * *